(12) United States Patent
Kurz et al.

(10) Patent No.: US 12,039,644 B2
(45) Date of Patent: *Jul. 16, 2024

(54) METHOD AND SYTEM FOR PRESENTING A DIGITAL INFORMATION RELATED TO A REAL OBJECT

(71) Applicant: Apple Inc., Cupertino, CA (US)

(72) Inventors: Daniel Kurz, Sunnyvale, CA (US); Anton Fedosov, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,542

(22) Filed: May 18, 2021

(65) Prior Publication Data

US 2021/0407160 A1    Dec. 30, 2021

Related U.S. Application Data

(63) Continuation of application No. 15/316,103, filed as application No. PCT/EP2014/061483 on Jun. 3, 2014, now Pat. No. 11,030,784.

(51) Int. Cl.
*G06T 11/60* (2006.01)
*G06F 3/16* (2006.01)
(Continued)

(52) U.S. Cl.
CPC ........... *G06T 11/60* (2013.01); *G06F 3/16* (2013.01); *G06T 19/006* (2013.01); *H04N 7/183* (2013.01)

(58) Field of Classification Search
None
See application file for complete search history.

(56) References Cited

U.S. PATENT DOCUMENTS 8,594,744 B2    11/2013   Emery
9,256,071 B1 *  2/2016   Spitzer ............. G06F 3/013
(Continued)

FOREIGN PATENT DOCUMENTS

CN    101961554 A    2/2011
CN    102144201 A    8/2011
(Continued)

OTHER PUBLICATIONS

Reitmayr et al.; "Collaborative Augmented Reality for Outdoor Navigation and Information Browsing;" Jan. 2004; pp. 32-41 (Year: 2004).*

(Continued)

*Primary Examiner* — Peter Hoang
(74) *Attorney, Agent, or Firm* — Blank Rome LLP

(57) ABSTRACT

The invention is related to a method of presenting a digital information related to a real object, comprising determining a real object, providing a plurality of presentation modes, wherein the plurality of presentation modes comprises an augmented reality mode, and at least one of a virtual reality mode and an audio mode, providing at least one representation of a digital information related to the real object, determining a spatial relationship between a camera and a reference coordinate system under consideration of an image captured by the camera, selecting a presentation mode from the plurality of presentation modes according to the spatial relationship, and presenting the at least one representation of the digital information using the selected presentation mode.

18 Claims, 10 Drawing Sheets

| (51) | Int. Cl. | | |
| --- | --- | --- | --- |
| | *G06T 19/00* | (2011.01) | |
| | *H04N 7/18* | (2006.01) | |

(56) References Cited

U.S. PATENT DOCUMENTS

| 10,629,003 | B2* | 4/2020 | Miller .............. G02B 27/0172 |
| --- | --- | --- | --- |
| 2003/0210832 | A1 | 11/2003 | Benton |
| 2012/0257036 | A1* | 10/2012 | Stenberg .............. G03B 31/00 |
| | | | 348/78 |
| 2012/0280917 | A1 | 11/2012 | Toksvig |
| 2013/0117377 | A1* | 5/2013 | Miller ................. A63F 13/35 |
| | | | 709/205 |
| 2013/0147801 | A1 | 6/2013 | Kurino |
| 2013/0263016 | A1 | 10/2013 | Lehtiniemi |
| 2014/0125698 | A1* | 5/2014 | Latta ................... A63F 13/65 |
| | | | 345/633 |

FOREIGN PATENT DOCUMENTS

| CN | 102473324 | A | 5/2012 |
| --- | --- | --- | --- |
| CN | 102598064 | A | 7/2012 |
| CN | 102655576 | A | 9/2012 |
| CN | 102667855 | A | 9/2012 |
| CN | 103063224 | A | 4/2013 |
| CN | 103246543 | A | 8/2013 |
| CN | 103697900 | A | 4/2014 |
| EP | 2327010 | A2 | 6/2011 |
| EP | 2579127 | A1 | 4/2013 |
| JP | 2011204047 | A | 10/2011 |
| KR | 20110136026 | A | 12/2011 |
| KR | 1020120088320 | A | 8/2012 |
| WO | 2010022386 | A2 | 2/2010 |
| WO | 2013088390 | A1 | 6/2013 |

OTHER PUBLICATIONS

"Advances in Location-Based Services," 8th International Symposium on Location-Based Services, Vienna 2011, Georg Gartner and Felix Ortag Editors, Retrived from the Internet: URL: http://books.google.de/books?hl=en&lr=&id=6ZujOcWns8EC&oi=fnd&pg=PA3&ots=9vqwofOol&sig=Px8cBodCFHX0=uCFKYaogWHOApg#v=onepage&q&f=false.

Alessandro, M., Dunser, A., and Schmalstieg, D., "Zooming Interfaces for Augmented Reality Browsers," Sep. 10, 2010 (Sep. 10, 2010), pp. 1-9, XP002735445, Retrieved from the Internet: URL: http://data.icg.tugraz.at/~dieter/publications/Schmalstieg_192.pdf.

Mark Billinghurst et al., "The MagicBook—Moving Seamlessly between Reality and Virtuality," Jun. 2001 (Jun. 2001), XP002735446, Retrieved from the Internet: URL: http://www.google.com/url?sa=t&rct=j&q=&esrc=s&source=web&cd=3&ved=0CEUQFjAC&url=http%3A%2F%2Fwww.ivanpoupyrev.com%2FE-library%2F2001%2Fchi2001demo.pdf&ei=kN_QVNPvNILuUP-Sg7Ap&usg=AFQjCNFUZhtU31Mv8uP_G8VKjVpnNIKtNg&bvm=bv.85076809,d.d24&cad=rja.

Singh Mona et al., "Augmented Reality Interfaces," IEEE Internet Computing, IEEE Service Center, New York, NY,—Institute of Elctrical and Electronics Engineers, US, vol. 17, No. 6, Nov. 1, 2013 (Nov. 1, 2013), pp. 66-70, XP011533819, ISSN: 1089-7801, DOI: 10.1109/MIC.2013.107.

* cited by examiner

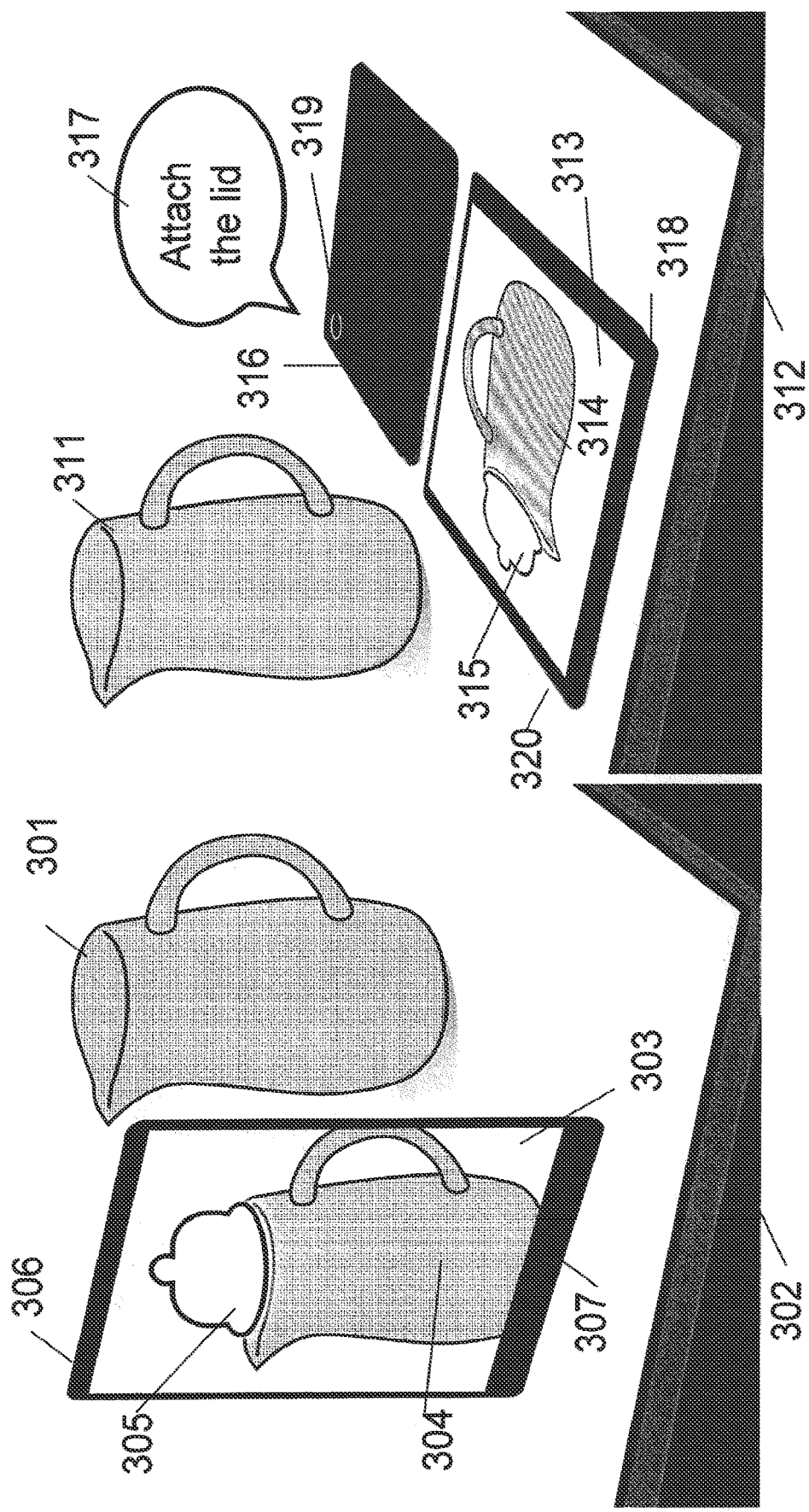

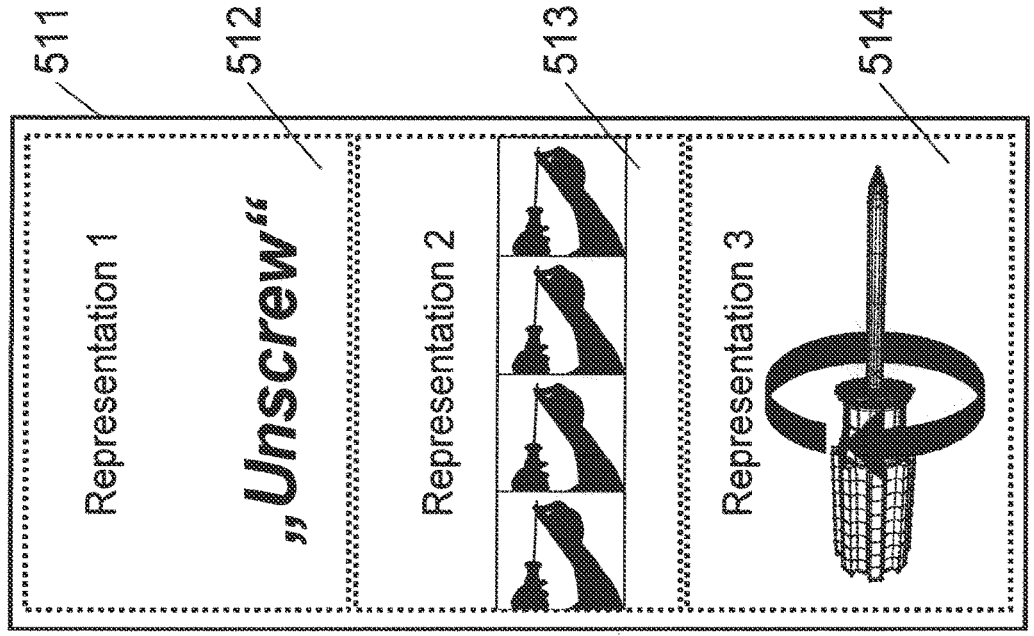
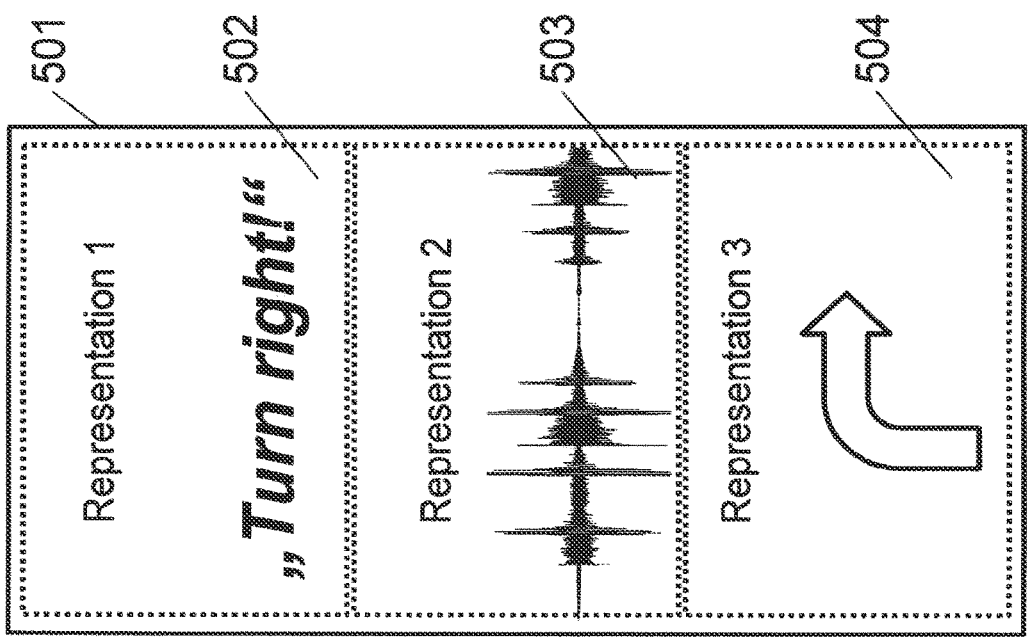
Fig. 5

METHOD AND SYTEM FOR PRESENTING A DIGITAL INFORMATION RELATED TO A REAL OBJECT

BACKGROUND

The present disclosure is related to a method and system for presenting a digital information related to a real object.

In augmented reality (AR), a view of a real environment, such as a video image of the real environment, is combined with an overlay of digital information, often in the form of one or more virtual objects in a spatial relationship to the real environment. Handheld augmented reality requires the user to hold up a camera-equipped device such that the camera captures an environment or an object with associated digital information. If the real environment or object is not visible in the camera image, the augmented reality view does not provide the digital information. Certain augmented reality applications support users in tasks that may take several minutes or even hours; examples include pedestrian navigation and manuals for the maintenance of products. It may be inconvenient for a user to hold the device throughout the performance of the task and the user might want to put the device down temporarily or to stow it away. In this case, when using the augmented reality view, the user is not provided with the digital information supporting his or her task, until the device is hold up again and the camera faces the object or environment again.

It was observed in user tests that this discontinuation in the user experience causes users to lose track of their tasks. We further observed that some users did not put the device down in the fear of missing something out, even though they suffered from fatigue as a result of holding up the device. Both situations described above lead to a frustrating user experience.

It was further discovered that a most critical issue is that handheld video see-through AR applications require the user to continuously hold up the handheld device. This is necessary since the back-facing camera needs to capture the scene that should be augmented. This is not appropriate—both for the elderly, but also for healthy users—because handheld devices are often heavy and their slick surfaces makes it difficult to hold them up over a longer period of time. Augmented reality tracking systems are faced with a challenge to accurately estimate an event of losing tracking in the perceivable time needed to set appropriate user expectations. Such systems usually work as binary on-off switches. Standard approaches in the context of augmented reality are mainly limited to an alert dialog informing the user about lost tracking and asking him or her to point the device's camera to the real object or environment for recovery of visual tracking.

EP 2 579 127 A1 proposes a method to determine the orientation of the head of a user of a mobile device. The system comprises the mobile device and a head-mounted accessory device which includes a digital compass to obtain the orientation of the head. The orientation is used to determine content to deliver to the user.

WO 2013/058950 A1 proposes a method of determining device orientation (i.e. facing downward orientation on the table). The device orientation is then used to activate an according notification profile (e.g. "Quiet").

US 2012/0280917 A1 proposes a method adjusting the device state (e.g. power saving mode) based on user intentions and/or identity using the device's sensors (touch, speed, light).

U.S. Pat. No. 8,594,744 B2 describes systems and methods for switching mobile device's mode of operation from speakerphone mode to handset mode based on sampling the user's voice. Additional user input is not necessarily needed on the event of the transition to another mode of information presentation. Sampling is solely performed on the user's voice data (captured with a microphone).

EP 2 327 010 A2 and WO 2010/022386 A2 describe navigation methods and systems in a three dimensional environment on a mobile device using a virtual camera, an orientation sensor, and touch interactions.

It would be desirable to provide a method and system for presenting a digital information related to a real object which is capable of providing a non-interrupted user interface and experience, e.g. during performance of a given user task on a handheld device, for example when putting the handheld device down.

SUMMARY

According to an aspect, there is disclosed a method of presenting a digital information related to a real object, comprising determining a real object, providing a plurality of presentation modes, wherein the plurality of presentation modes comprises an augmented reality mode, and at least one of a virtual reality mode and an audio mode, providing at least one representation of a digital information related to the real object, determining a spatial relationship between a camera and a reference coordinate system under consideration of an image captured by the camera, selecting a presentation mode from the plurality of presentation modes according to the spatial relationship, and presenting the at least one representation of the digital information using the selected presentation mode.

According to another aspect, there is provided a method of presenting a digital information related to a real object, comprising determining a real object, providing a plurality of presentation modes, wherein the plurality of presentation modes comprises an augmented reality mode, and at least one of a virtual reality mode and an audio mode, providing at least one representation of a digital information related to the real object, determining a spatial relationship between a human eye and a reference coordinate system under consideration of at least one image captured by at least one camera, selecting a presentation mode from the plurality of presentation modes according to the spatial relationship, and presenting the at least one representation of the digital information using the selected presentation mode.

According to another aspect, there is provided a system for presenting a digital information related to a real object, comprising a processing system which is configured to determine a real object, provide a plurality of presentation modes, wherein the plurality of presentation modes comprises an augmented reality mode and at least one of a virtual reality mode and an audio mode, provide at least one representation of a digital information related to the real object, determine a spatial relationship between a camera and a reference coordinate system under consideration of an image captured by the camera, select a presentation mode from the plurality of presentation modes according to the spatial relationship, and to present the at least one representation of the digital information using the selected presentation mode.

According to another aspect, there is provided a system for presenting a digital information related to a real object, comprising a processing system which is configured to determine a real object, provide a plurality of presentation modes, wherein the plurality of presentation modes comprises an augmented reality mode and at least one of a virtual reality mode and an audio mode, provide at least one representation of a digital information related to the real object, determine a spatial relationship between a human eye and a reference coordinate system under consideration of at least one image captured by at least one camera, select a presentation mode from the plurality of presentation modes according to the spatial relationship, and to present the at least one representation of the digital information using the selected presentation mode.

Particularly, it is proposed to automatically determine if the current spatial relationship between the camera and the real object or environment is suited for presenting digital information associated with the real object or environment by using (visual) augmented reality (AR) presentation, and if it is not, it is proposed to switch to a different mode of information presentation (like virtual reality (VR) presentation or audio presentation), which is better suited to communicate the associated digital information to users which supports them in their task. The current invention helps to solve the above mentioned drawbacks by automatically switching from the AR presentation to another mode of information presentation (e.g. VR presentation or audio presentation).

Throughout this document, the terms "AR presentation", "AR presentation mode", "AR mode", "augmented reality presentation", "augmented reality presentation mode", and "augmented reality mode" are used interchangeably. Further, this document uses the terms "VR presentation", "VR presentation mode", "VR mode", "virtual reality presentation", "virtual reality presentation mode", and "virtual reality mode" interchangeably. Also the terms "audio presentation", "audio presentation mode", and "audio mode" are used interchangeably throughout this document.

The problem the present invention is trying to tackle is to remove the gap of interrupted user experience when putting a handheld device down or stowing it away. This could for example be detected based on (changes of) the device orientation. It is thus proposed a system and method for continuous user experience, particularly by changing the mode of information presentation according to at least part of the spatial relationship between a camera, or eye, respectively, and a real object. The advantage over the common approaches is that we may continuously maintain logical connection with a user and present digital information related to a real object in such a way that is best suited for a given context, i.e. for a spatial relationship between the camera, or eye, and the object.

Currently, in AR applications (e.g. AR browsers) and/or AR or computer vision software development kits, states are provided whether objects or environments are tracked or not, and the application developer may react to the event that an object or environment is not tracked, e.g. by providing visual instructions to the user telling how to reach the state that the desired object or environment is tracked, e.g. by "Please point the camera towards the magazine cover to start the augmented reality experience". A future version of an AR application and/or AR or computer vision software development kit, according to the invention, might provide states, telling that 1) the digital information can be presented spatially registered rendered on top of a live video image or live view of the object (AR mode), or 2) that the digital information can be presented visually on the screen but without any live registration (VR mode), or 3) that the digital information cannot be presented visually on the screen but may be presented acoustically, e.g. by speakers or headphones (Audio mode).

An application developer may handle these cases manually, or the SDK (software development kit) might understand a description of digital information which comprises different representations, e.g. including 3D models for the AR mode, 3D models or 2D images for the VR mode, textual instructions which may be printed on the screen in combination with either the AR or the VR mode, or which may be read to the user in an Audio mode using text-to-speech synthesis software. Different modes of information presentation from the device to a user might be equivalent (meaning they carry the same information) or they may differ in terms of richness of detail. Modes with little details may encourage the user to switch to a mode with richer details if beneficial.

Different from the above mentioned prior art, the approach according to the invention determines a suited mode of digital information presentation based on the current spatial relationship between a camera and a real object to which the digital information is related. The method of the present invention may perform changes in the way a user consumes (or perceives) digital information about the object with respect to a context of observation (i.e. to switch between (video see-through) AR mode, VR mode, and Audio mode) to deliver a non-interrupted user experience, e.g. during performance of a given user task. Examples of the user tasks include performing maintenance of a product, and navigating to a specified destination.

The present invention provides the advantage that it presents digital information related to a real object (to a user) in the best suited mode of information presentation. Particularly this includes an augmented reality information presentation mode which provides particularly rich information but is only suitable in certain situations, i.e. for certain spatial relationships between the camera and the real object. The advantage of this invention over the prior art is that the user is still provided with the digital information related to a real object even if the situation, i.e. spatial relationship between the camera and the real object, is not suited for AR, while prior art discontinues presentation of the digital information related to the real object in this case.

Adaptive contextual switching for AR User Interfaces is not widely explored for maintenance and pedestrian navigations tasks. Urban cycling navigation can also benefit from this invention. We have explored the spatial relationship between a tracking system (i.e. at least using a camera sensor) and the observed real object to which digital information is related. Digital information of a real object is delivered in a suitable way to the user at a given context of observation: visually (e.g. in form of descriptive text, images, 3-D models, 2-D maps, etc.) through the display superimposed in a video feed, visually without any live camera feed, or acoustically through the speakerphone or headphones.

For example, the processing system according to the invention is comprised at least in part in a mobile device (such as a mobile phone, wearable computer, tablet computer, or mobile computer, often called laptop) and/or in a server computer adapted to communicate with the mobile device. The processing system may be comprised in only one of these devices, e.g. in the mobile device or in the server computer, or may be a distributed system in which one or more processing tasks are distributed and processed by one or more processing devices which are distributed and are communicating with each other, e.g. by point to point communication or via a network.

According to an embodiment, the system comprises a mobile device which comprises the camera and a display device.

The embodiments, aspects and examples described herein with respect to the method can equally be implemented by the processing system being configured (by software and/or hardware) to perform the respective steps. Any used processing device may communicate via a communication network, e.g. via a server computer or a point to point communication, with one or more cameras, displays and/or any other components.

According to another aspect, the invention is also related to a computer program product comprising software code sections which are adapted to perform a method according to the invention. Particularly, the software code sections are contained on a computer readable medium which is non-transitory. The software code sections may be loaded into a memory of one or more processing devices (such as microprocessors) as described herein. Any used processing devices may communicate via a communication network, e.g. via a server computer or a point to point communication, as described herein.

According to an embodiment, the plurality of presentation modes further comprises an audio mode. Particularly, the audio mode generates a sound according to the at least one representation of the digital information.

According to an embodiment, the augmented reality mode visually blends in the at least one representation of the digital information on a display device in a live view of the real object according to at least part of a spatial relationship between the camera or human eye, respectively, and the real object, the virtual reality mode visually presents the at least one representation of the digital information and a representation of the real object on a display device, and the audio mode generates a sound according to the at least one representation of the digital information.

For example, the live view of the real object is captured as at least one image by the camera, and the display device includes a screen, wherein the at least one image is displayed on the screen. According to another example, the live view of the real object is captured by the human eye, and the display device includes a semi-transparent screen.

According to an embodiment, the invention comprises determining at least one image of at least part of the real object captured by the camera as at least one key image according to the pixel information of the at least one image and/or according to a pose of the camera relative to the reference coordinate system when the camera captures the at least one image and/or according to a manual input.

For example, the representation of the real object comprises the at least one key image.

According to an embodiment, the invention comprises determining at least one pose of the camera relative to the reference coordinate system when the camera captures at least one image of at least part of the real object as at least one key pose according to the pixel information of the at least one image and/or according to at least one threshold and/or according to a manual input.

For example, the representation of the real object is presented according to the at least one key pose.

According to an embodiment, the real object is determined according to at least one image of at least part of the real object captured by the camera.

According to another embodiment, the real object is determined according to at least one manual input.

According to an embodiment, the at least one representation of the digital information comprises at least one of a three-dimensional object, a triangle mesh, a point cloud, a volume dataset, a Bezier curve, a spline, a surface description, an image, a sound, a text, a video, and an animation.

According to an embodiment, the reference coordinate system is associated with the real object.

According to another embodiment, the reference coordinate system is associated with the earth or a tracking system.

For instance, the selecting a presentation mode from the plurality of presentation modes according to the spatial relationship comprises determining if at least part of the real object is within the field of view of the camera, if yes, selecting the augmented reality mode as the presentation mode, otherwise, selecting at least one of the virtual reality mode and an audio mode as the presentation mode.

According to another embodiment, the selecting a presentation mode from the plurality of presentation modes according to the spatial relationship comprises determining if the spatial relationship indicates that a distance between the camera and the real object is below a threshold, if yes, selecting the augmented reality mode as the presentation mode, otherwise, selecting at least one of the virtual reality mode and an audio mode as the presentation mode.

For example, the selecting at least one of the virtual reality mode and the audio mode as the presentation mode further comprises determining an orientation of the camera with respect to a gravity direction, and selecting one of the virtual reality mode and the audio mode as the presentation mode according to the orientation of the camera.

According to an embodiment, the selecting at least one of the virtual reality mode and the audio mode as the presentation mode further comprises determining if a gaze of one or more eyes locates on a display device, wherein the at least one representation of the digital information is presented on the display device using the augmented reality mode or the virtual reality mode, if yes, selecting the virtual reality mode as the presentation mode, otherwise, selecting the audio mode as the presentation mode.

According to an embodiment, the spatial relationship between the camera and the reference coordinate system is further determined according to a GPS, a compass, and/or an inertial sensor attached to the camera or according to a tracking system.

According to an embodiment, the spatial relationship between the camera and the reference coordinate system is a first spatial relationship, and the reference coordinate system is a first reference coordinate system, and the method further comprising determining a second spatial relationship between a display device and a second reference coordinate system, wherein the at least one representation of the digital information is presented on the display device using the augmented reality mode or the virtual reality mode.

For example, the second reference coordinate system is associated with a human eye, and the second spatial relationship is determined according to at least one image of the eye captured by a camera attached to the display device.

According to another embodiment, the second reference coordinate system is associated with the real object, and the second spatial relationship is determined according to at least one image of at least part of the real object captured by a camera attached to the display device.

According to another embodiment, the second reference coordinate system is associated with the earth or a tracking system, and the second spatial relationship is determined according to the tracking system or an inertial sensor attached to the display device.

According to an embodiment, the selecting a presentation mode from the plurality of presentation modes according to the spatial relationship comprises selecting the presentation mode according to the first spatial relationship and the second spatial relationship.

According to an embodiment, the invention further includes informing the user that one of the plurality of presentation modes provides the user with a richer representation of the digital information than another one of the plurality of presentation modes, and giving an instruction about a movement or position or orientation for changing the spatial relationship between the camera or eye, respectively, and the reference coordinate system such that the one of the plurality of presentation modes is suited for presenting the digital information in a richer way.

For example, the selecting a presentation mode from the plurality of presentation modes according to the spatial relationship comprises selecting the presentation mode according to the first spatial relationship and the second spatial relationship.

For example, the first spatial relationship is determined based on visual tracking and describes the relationship between the camera and a real object. The second spatial relationship could be measured, for example, with inertial sensors and refer to the relationship between a display (device) and earth. The first spatial relationship could be used to determine whether the real object is visible in the camera image, which might be a prerequisite for the augmented reality presentation mode. The second spatial relationship in this case might be indicative of whether the display faces downwards and can therefore not be observed by a user, or if it does not face downwards. Suitability of the virtual reality presentation mode might, for example, require that the display may be observable by a user. Note that the display (device) and the camera are not necessarily connected in a rigid way. Therefore, both the first and the second spatial relationship might refer to the same coordinate system, e.g. associated with the real object, but still be completely unrelated if the camera and the display device move unrelatedly.

For example, the level of richness is manually defined as the augmented reality mode being the presentation mode with the richest information, or the level of richness is defined for a particular use case and each digital information independently.

According to an embodiment, a method comprises the following steps: 1) Determine at least part of a spatial relationship between a camera and a real object, 2) determine from the at least part of the spatial relationship which mode of information presentation is suitable to provide the digital information related to the real object, and 3) present digital information related to the real object by means of the determined mode of the information presentation. Optionally, an additional step can be performed between 2) and 3) which checks availability of data representations of a digital information related to the real object and based on this information and the outcome of 2), i.e. which mode of presentation is suitable, determines which mode to use in 3).

BRIEF DESCRIPTION OF THE DRAWINGS

Aspects and embodiments of the invention will now be described with respect to the drawings, in which:

FIGS. 3*a*-3*b* show another exemplary scenario according to an embodiment of the present invention, FIG. 5 shows an example of an underlying data representation layer of digital information in an embodiment of the invention.

DETAILED DESCRIPTION

Figure 1:
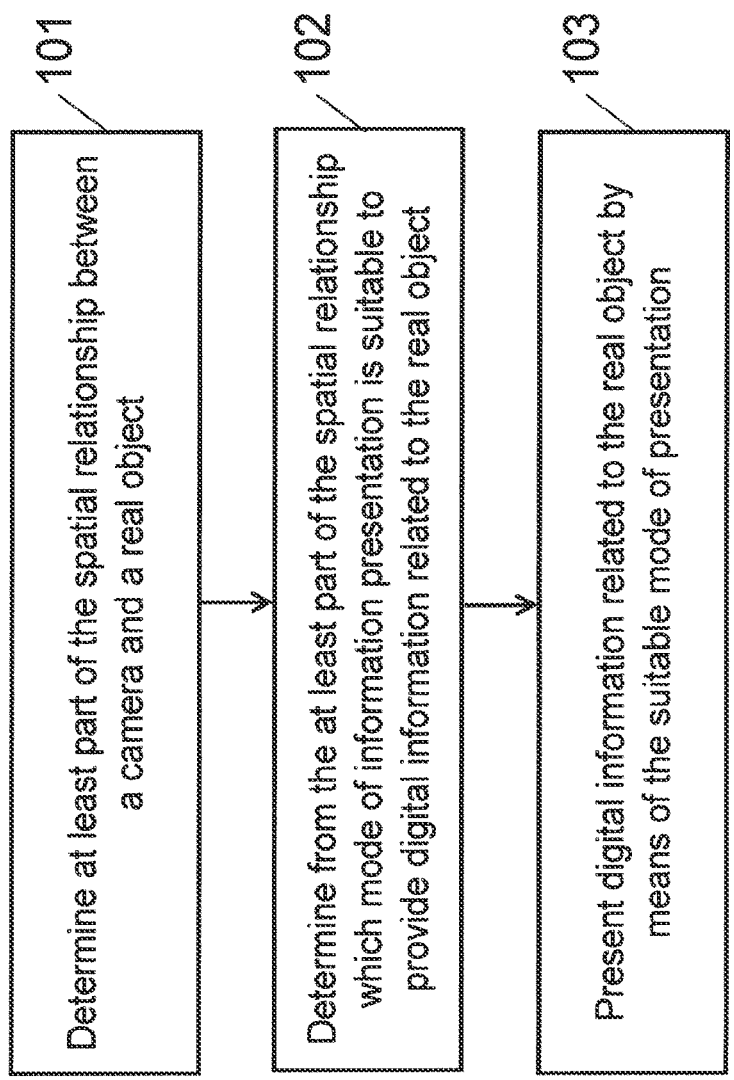
FIG. 1 shows a flow diagram according to an embodiment of the invention.

FIG. 1 shows a flow diagram according to an embodiment of the invention. In a first step 101 at least part of the spatial relationship between a camera and a real object (e.g. a reference coordinate system associated with the real object) is determined. The at least part of the spatial relationship between a camera and a real object is then used in step 102 to determine which mode of information presentation is suitable to provide digital information related to the real object. Step 103 presents digital information related to the real object by means of the suitable mode of presentation. Exemplary embodiments of the invention are shown in FIGS. 2 and 3 which will be explained herein below.

The digital information may be associated with or related to the real object by an authoring process. For example, a user could assign the digital information to an image of the real object using a computer to relate the digital information to the real object. In another example, the real object may be represented by a CAD model or a set of image features (e.g. SIFT descriptors). The digital information may be linked to the CAD model or the set of image features. Step 101 in FIG. 1 can be implemented in different ways depending on available information and sensors, as well as depending on the use case.

A spatial relationship between a camera and a real object may include physical distances or angles. A spatial relationship may include binary information. For example, a spatial relationship may be that the real object is located in front of the camera, i.e. in front of the image plane of the camera. A spatial relationship may also be that at least part of the real object is located within the frustum of the camera, which may be parameterized as a pyramid. Analogously the spatial relationship might refer to binary information about whether or not at least part of the real object is located within any geometric shape, space, or halfspace in the coordinate system of the camera, including a sphere, a tetrahedron, a cube, an octahedron, a pyramid, a cone, a cylinder or any other three-dimensional shape. All these examples refer to the translation between the camera and the real object, which is at least part of a spatial relationship. Other examples how to define the spatial relationship include providing a (1D) distance (e.g. depth) between the camera and the real object, or providing at least one of the three coordinates indicative of the three-dimensional translation in Euclidean space between the camera and the real object given for example in physical units, such as millimeters or meters. For example, the spatial relationship may describe the height of the real object relative to the height of the camera. The spatial relationship may further be indicative of an orientation. For example it might describe one, two, or three degrees of freedom of the orientation of the real object in the coordinate system of the camera. It might also describe one, two, or three degrees of freedom of the orientation of the camera in the coordinate system of the real object. For example, if the real object is the environment (e.g. a city, buildings, plants, or a land), at least part of the spatial relationship between a camera and the real object may comprise the orientation of the camera with respect to gravity, which contains information about two degrees of freedom, and can be measured with inertial sensors. Further, a GPS sensor attached to the camera could also be used to determine a position of the camera relative to the environment, which is a spatial relationship. A spatial relationship might refer to anything and any combination of what has been discussed above. Analogously, at least part of a spatial relationship might also refer to any combination of what has been discussed above.

In an embodiment the spatial relationship between a camera and a real object is determined based on the camera image and a model of the real object using model-based visual tracking. This can for example be implemented using point features, feature descriptors, feature classifiers, or line features from the camera image and correspondences thereof with the model.

The spatial relationship may be determined based on an image-based object recognition method in another embodiment, which determines if a real object is at least partially within the view frustum of the camera or not.

In another embodiment the spatial relationship between a camera and a real object is determined based on range data as provided by a depth-sensing camera. If a model of the real object exists, the spatial relationship may be expressed as a 6DoF (DoF: degree of freedom) rigid body transformation combining a 3D rotation and a 3D translation.

Another embodiment determines the (1D) distance between a camera and a real object. Another embodiment does not rely on any camera image for determining at least part of the spatial relationship between a camera and a real object, but instead uses information provided by auxiliary sensors attached to the camera, such as inertial sensors, (three-axis) accelerometers, (three-axis) gyroscopes, electronic compasses, GPS receivers, or any other positioning system, for example based on Bluetooth. In these cases, the partial spatial relationship between a camera and a real object may comprise only (part of) a translation, or only (part of) a rotation, or a combination of both.

A spatial relationship may include at least part of a rotation, at least part of a translation, and it may further include information on the certainty of the individual parts or degrees of freedom of the spatial relationship. In particular, the spatial relationship may include information that at least one or all degrees of freedom could not be determined with a certainty greater than a random guess. This may for example be due to visual tracking failing to localize an object in the camera image.

Step 102, in which a suited mode of information presentation is determined based on at least part of the spatial relationship between a camera and a real object, may also depend on in which representations the digital information is available and it may further depend on the readings of additional sensors, as well as on the use case.

The modes of information presentation might have different priorities, and an embodiment of step 102 decides on the mode with the highest priority among the suited modes according to the at least partially known spatial relationship.

In an embodiment, step 102 considers augmented reality presentation suitable if all six degrees of freedom of the rigid body transformation between the camera and the real object are provided with a certainty or probability above a particular threshold that has been manually defined, e.g. a certainty value 0.25, or a unit value 0.1 meter or 1 degree. For the certainty value, in one example, it may designate that it is 100% certain that one is inside the office. The certainty in this case is 1.0.

In an embodiment, step 102 considers virtual reality presentation suitable if the orientation of the camera relative to the real object is within a defined range of orientations. This defined range of orientations may be indicative of orientations in which a display, which is rigidly connected to the camera, may be observed by a user. This is further elaborated in the context of FIGS. 2a, 2b, 3a, and 3b.

Embodiments of step 102 and sub steps thereof are discussed in FIGS. 6-9.

Figure 2B:
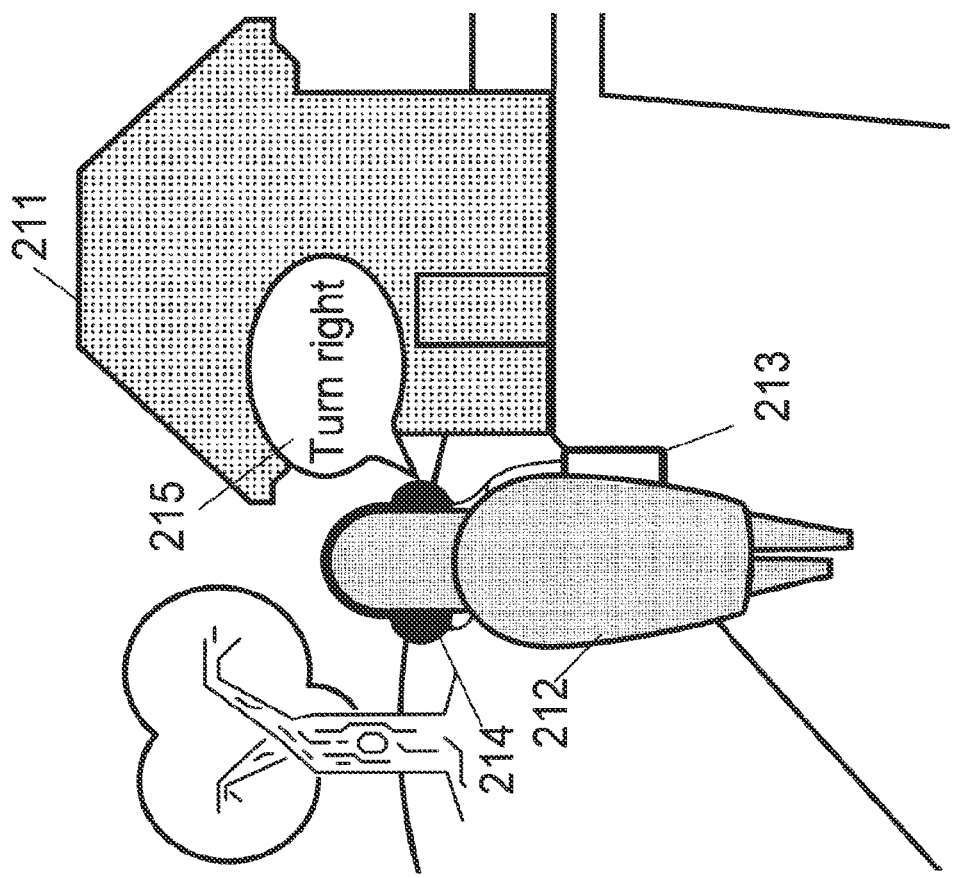
FIGS. 2*a*-2*b* show exemplary scenarios according to an embodiment of the present invention.
Figure 2A:
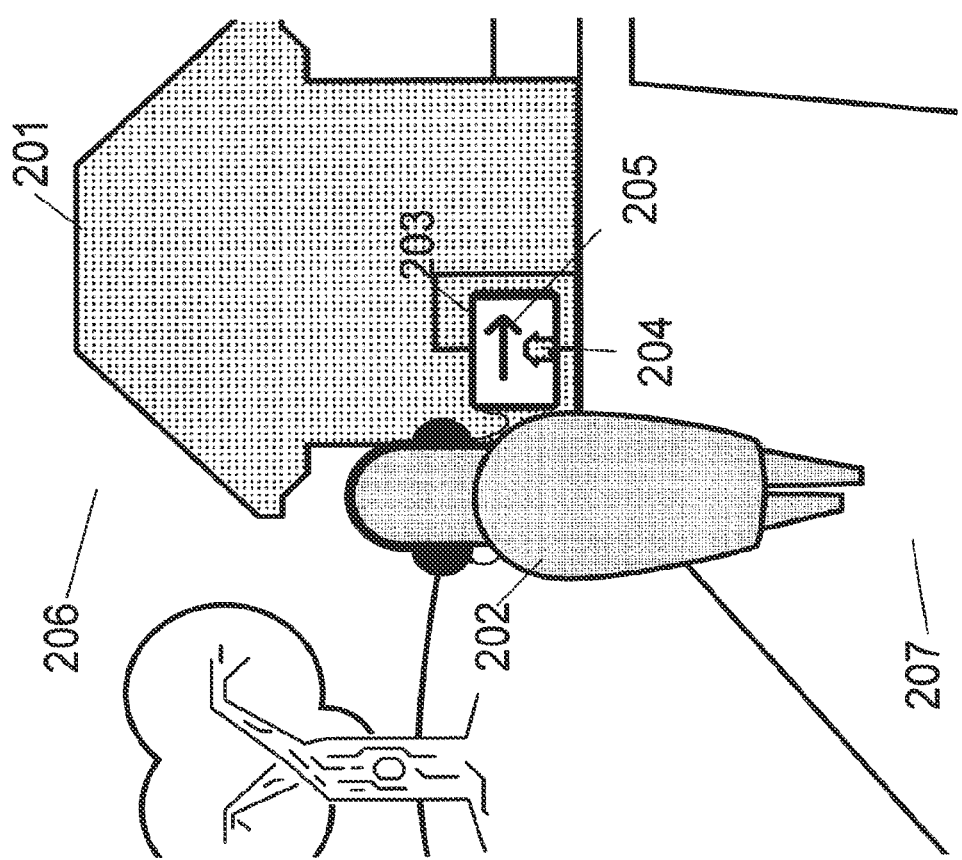

FIG. 2a shows an embodiment of the present invention. Within a real environment 206 including a house 201 and a street 207, there is a user 202 holding a computer (e.g., a mobile device, such as a smartphone or tablet computer) with a back-facing camera and a display 203. The user holds the computer up such that the back-facing camera captures at least part of the house 201, which is a part of the real object (i.e. the real environment 206) in this example. The digital information related to the real object is that the user needs to turn right in front of the house to reach the destination. For example, in one computer implementation, a navigation information (e.g. a path to a destination) is associated with the real environment. The navigation information may be saved or pre-stored in a computer or be generated by a computer program with a given destination.

The real object 206 (i.e. the real environment) or the part of the real object (i.e. the house 201) may be first determined automatically according to an image of at least part of the house captured by the camera (e.g. the back-facing camera) using an image recognition algorithm. A location of the camera may be obtained from a GPS sensor, which could determine the real object (i.e. the real environment). The real object may also be manually provided, e.g. by the user.

When multiple entities of digital information are associated with the real object, at least one of the multiple entities of digital information is manually or automatically chosen to be presented to the user.

In the present example, a camera localization method is performed on the computer to determine at least part of the spatial relationship between the back-facing camera and the house, i.e. a part of the real environment, i.e. the real object. The camera localization method may use information from images of the back-facing camera, but it may also function without any camera, e.g. based on GPS, inertial sensors and/or an electronic compass. Based on the determined at least part of a spatial relationship, an embodiment of this invention determines that video see-through augmented reality is a suitable form of information presentation. Accordingly, on the display there is shown a live image 204 of the environment captured by the back-facing camera as well as a spatially registered 3D instruction element 205, which in this example is a representation of the digital information related to the real object. The spatial registration is achieved based on the determined at least part of the spatial relationship of the back-facing camera relative to the house, and therefore environment, i.e. real object. The 3D instruction element 205, which is an arrow (i.e. a representation of "turn right") in this case, supports the user in navigating to a certain target destination by telling the user to turn right in front of the house.

In a different situation according to FIG. 2*b*, there is the same user 212 in a real environment including a house 211 and a street. The user has a computer with a back-facing camera and a display 213 hanging around the neck. In this case, the back-facing camera does not capture any part of the house 211, which is a part of the real object in this example. A camera localization method is performed on the computer to determine at least part of the spatial relationship of the back-facing camera relative to the house. The camera localization method may use information from images of the back-facing camera, but it may also function without any camera, e.g. based on GPS and inertial sensors. The determined partial spatial relationship is processed by an embodiment of this invention which determines a suited mode of information presentation. The digital information in this case is again the information that the user should turn right in front of the house. Because the camera image does not capture any part of the house, displaying a live image of the environment captured by the back-facing camera with a spatially registered 3D instruction element located close to the house would result in the 3D instruction not being visible. Therefore, (video see-through) augmented reality is not a suited mode of information presentation in this case. Furthermore, because the computer is hanging around the user's neck, the user cannot observe the display. Therefore, any visual mode of information presentation is not suited. This can for example be determined according to FIG. 6.

In another embodiment, a spatial relationship between the display and a reference coordinate system may also be determined as an additional condition for determining a suitable presentation mode. In this example, the spatial relationship between the display and the eye of the user indicates if the user observes the display. For this, a front-facing camera that is attached to the display could be used to detect human eyes based on images captured by the front-facing camera. If none of the eyes is detected in an image of the front-facing camera, the user's eye may be determined to be not in the front of the display and thus the user cannot observe the display.

In such situation, the invention presents the information corresponding to the information presented by the instruction element 205 in a different, more suitable, mode of information presentation, which is in the present case an audio mode. Using headphones 214 the invention presents the user with an audio signal 215 telling the user to turn right. This could for example be implemented using text-to-speech software.

FIG. 3*a* shows another embodiment of the invention. A real object 301 located on a table 302 is captured by the back-facing camera 306 of a computer 307 with display 303. The computer 307 includes one or more processing devices, such as one or more microprocessors. The image captured by the camera 306 is processed to determine at least part of the spatial relationship between the real object 301 and the back-facing camera 306 of the computer 307. An embodiment of this invention determines that given the spatial relationship, which is indicative of the real object being partially inside the field of view (FOV) of the camera, i.e. partially visible in the camera image, the augmented reality presentation mode is suitable.

As a result, on the display 303 of the computer 307 there is shown the image 304 captured with the back-facing camera 306 showing at least part of the real object 301. There is further shown the digital information related to the real object, which is a virtual object 305 that has a spatial relation (i.e. a known pose) to the real object 301 and is shown overlaid onto the camera image. In the present example the real object 301 is a mug and the virtual object 305 is a lid for the mug. The virtual object is displayed spatially registered with the image of the real object based on the determined at least part of the spatial relationship between the real object 301 and the back-facing camera 306 of the computer 307. In this example, the spatial relationship between the real object 301 and the back-facing camera 306 is a rigid 6DoF transformation including a 3D translation and a 3D rotation. The representation of the digital information (i.e. virtual lid 305) can in this case for example be a three-dimensional object composed of triangles potentially with attributes assigned to their vertices, such as color, normal, or texture coordinates.

In a different situation, as shown in FIG. 3*b*, another embodiment of the invention runs on a computer 318 with display 313 and back-facing camera 320, which is lying on a real table 312 next to a real object 311. The real object is not captured in the camera image of the back-facing camera because the real object is not at a position within the FOV of the camera. This specific spatial relationship between the real object and the camera (i.e. the real object being out of the FOV of the camera) may be determined according to an image recognition method to detect if the real object is partially in the camera image. Therefore an explanation of a lid that might be put on the real object, which is a mug, cannot be performed by rendering it spatially registered with a live camera image showing at least part of the real object, as would be done in the augmented reality presentation mode.

One embodiment of this invention determines this specific spatial relationship and a suitable mode of presentation according to the orientation of the camera and the orientation of the real object relative to the gravity direction. Because visual object detection is not capable to determine the position and orientation of the real object relative to the camera based on a camera image, in this case only the orientation of the camera relative to the real object is known, given that the real object has a known orientation with respect to gravity. This can for example be determined based on the readings of inertial sensors. Further, the orientation of the real object with respect to the gravity direction may be manually provided or automatically determined. For example, if the real object is visible in the camera image before, the orientation of the real object with respect to the camera direction may be determined from the camera images of the real object. The camera orientation with respect to the gravity direction could be obtained from a gravity sensor or an image of the camera that captures a ground plane. Therefore, the orientation of the real object with respect to the gravity direction could be determined automatically.

In another embodiment, the spatial relationship between the camera and the real object may also be determined by using a tracking system. For example, an optical tracking comprising several optical cameras attached to fixed positions (e.g. on a ceiling in an indoor environment) may be used to determine positions and orientations of the camera and the real object in the coordinate system of the optical tracking system.

Because not all degrees of freedom of the spatial relationship between the real object and the camera are known with a confidence greater than a given threshold, an embodiment of this invention decides that the augmented reality presentation mode is not suited in FIG. 3b. However, the virtual reality presentation mode is suited in this case because the orientation of the camera relative to the real object indicates that the display is facing upwards and as a result might be visible to the user.

Another embodiment of this invention determines this specific spatial relationship according to an image recognition or tracking method to detect if the real object is partially in the camera image or not.

In this example, the invention shows an image 314 of the real object which is not a live image but has been captured earlier. The image can also be a rendering of a 3D model of the real object. With this image of the real object there is displayed spatially registered a virtual object 315, which is a lid for the mug and represents the digital information related to the real object represented by a three-dimensional object. Based on this visualization, a user might understand the spatial and semantic relation between the real mug on a table and a lid, which is not physically present without the need of a live image of the real object.

In this example, a spatial relationship between the display and the earth may be used as an additional condition for determining a suitable presentation mode for presenting the virtual lid associated with the real mug. In the situation that the real mug is not within the camera's frustum, the virtual reality presentation mode is determined to be used to present the virtual lid when the display screen is facing upwards, while the audio presentation mode is determined to present the virtual lid when the display screen is facing downwards.

In the event when the orientation of the device 316 with display and back-facing camera 319 is not suitable to present the digital information in augmented reality or virtual reality modes, an audio mode 317 will be chosen for information presentation and an appropriate format of data representation will be chosen. Instructions will be given to the user in audio format, e.g. using a text-to-speech engine or predefined playback of the audio files whichever is available.

Figure 4:
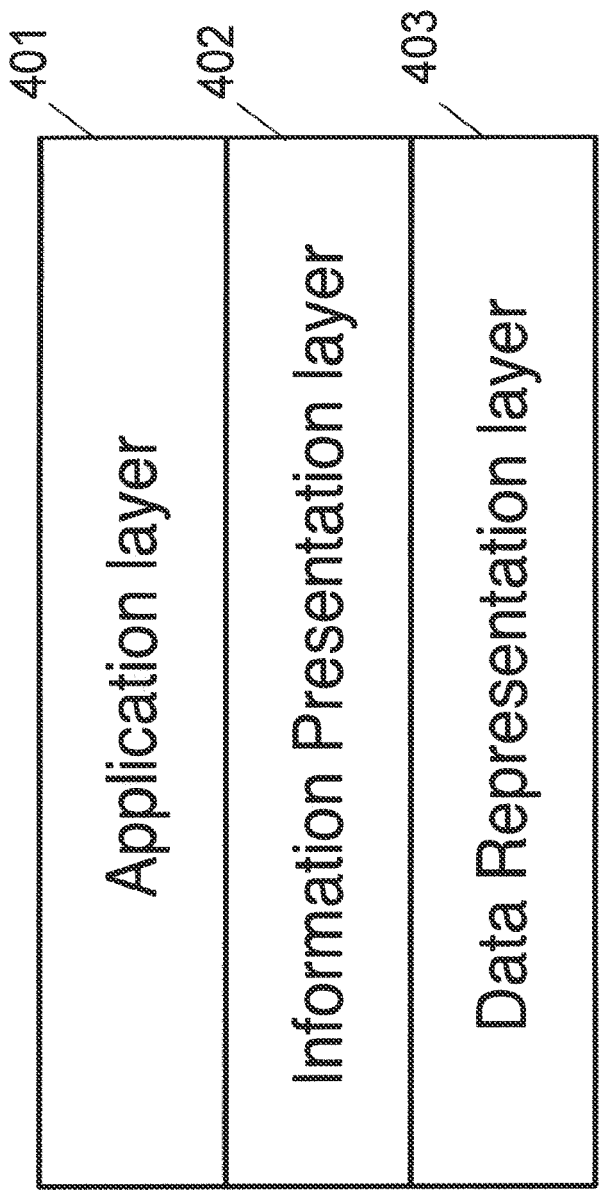
FIG. 4 depicts basic layers of architecture according to an embodiment of the invention.

FIG. 4 outlines basic layers of architecture according to an embodiment of the described invention. The application layer 401 incorporates underlying logic of an exercised use case. The information presentation layer 402 comprises the several modes of information presentation for a digital information (e.g. "turn right" or "attach the lid"). We have defined a set of 1) AR (augmented reality) mode: the digital information can be presented spatially registered rendered on top of a live view of the real object, and 2) VR (virtual reality) mode: that the digital information can be presented visually on the screen but without any live registration to a live view, and 3) Audio mode: that the digital information cannot be presented visually on the screen but may be presented acoustically (e.g. by speakers or headphones). Different modes of information presentation for a digital information may require different kinds of data representation of the digital information. The data representation layer 403 incorporates different representations of a digital information including but not limited to textual information, audio files, 2-D static imagery, video clips, 3-D models. Representations of the digital information could be populated statically through a number of authoring tools and methods during a design time of the application, or can be generated dynamically through a communication request to an appropriate content delivery service. We also envision a dynamic information acquisition through a number of 3-D reconstruction techniques that can be used for 3-D model creation (i.e. clay modeling, etc.).

FIG. 5 shows an example of the underlying data representation layer 403 of digital information in an embodiment of the invention. For example the digital information to turn right 501 may be stored in different representations. In a first representation 502 the information may be represented by a string, i.e. a sequence of characters, spelling "Turn right!". This representation could for example be printed on a display or it could be read out loud using text-to-speech software depending on which mode of information presentation is suitable. The second representation 503 in this example is a digital audio file representing a recording of an instruction to turn right spoken by a human being. The third representation 504 is a two-dimensional or three-dimensional arrow bent to the right. This representation can for example be used to be shown spatially registered with a live camera image if the AR mode is a suitable mode of information presentation. It may be further used in a virtual reality mode in combination with an image of the real object which is not live.

The digital information of an instruction to unscrew a screw 511 could for example be represented by a string "Unscrew" 512, by a digital video sequence 513 showing how a hand unscrews a screw, or by a digital 3D model of a screwdriver 514 potentially with animations.

Different modes of information presentation may require different representations of the digital information. Different modes of information presentation may put different constraints on the spatial relationship between a camera and a real object. Different modes of information presentation may have different richness of detail. An embodiment of this invention may automatically determine the mode of information presentation with the highest richness of detail, which is consistent with the present spatial relationship between a camera and a real object as well as depending on the available representations of the digital information to be presented to the user.

Example Embodiments

1) Compute poses of a camera relative to the real object, i.e. track the real object.

2) Store the last valid poses while tracking the real object.

3) On lost tracking provide alternative presentation mode to deliver information.

a. Use case: Maintenance (see FIG. 3b). Once tracking is lost (e.g. the device is placed on the table 312) switch to VR mode and bring up a 3D model 314 of the tracked object 311, and use one of the last valid poses from tracking to render the virtual object. The real object in this use case is a mug that requires to be maintained. The virtual object is a 3D model 315 of a lid that is registered to the real object that requires maintenance.

b. Use case: Pedestrian Navigation (see FIG. 2b). Once tracking is lost (e.g. the user puts the device into a bag, or straps it at the shoulder 213), the present method brings up audio navigation instructional mode 215 via headsets 214 (text-to-speech engine may be required). For example, digital maps as disclosed in reference [1] ([1]: http://books-.google.de/
books?hl=en&lr=&id=6ZujOcWns8EC&oi=fnd&pg=PA3&ots=-9vqwofOoL&sig=Px8cBodCFHX0-
uCFKYaogWHOApg#v=onepage&q&f=false) could be used as an alternative on lost tracking if the user keeps interacting with a device (e.g. pointing camera to the ground). The real object in this use case is the real environment, e.g. at least part of the environment 211 (e.g. a city). The digital information associated with the environment may be a map of the environment or a part of the map or the information to turn right in front of the house. The representation of the digital information is auxiliary information 215 necessary to get to a destination, e.g. a text which is read using text-to-speech software.

4) Keep running the camera and attempt tracking in the background while presenting information in 3).

5) Once tracking reinitializes, switch to the augmented reality mode of information presentation.

One embodiment of this invention incorporates the use of additional devices (e.g. smart watches, head-mounted devices, etc.) available at the time of observation of a real object. These wearable devices could not only deliver audio-visual information about a real object, but, leveraging an on-board camera sensor, be a main participant of the described system for interacting with a digital information about a real object. If more than one camera-equipped device exists, then an embodiment of this invention determines for each of them which mode of information presentation is suited according to a spatial relationship between the camera and the real object. A second step then determines which device may provide the richer information presentation mode, and then assigns presentation precedence accordingly. For example, a user is in possession of a tablet computer and smart watch both equipped with a camera during observation of a real object. The method will select the mode of information presentation for each device once spatial relationships have being determined. If the virtual reality mode of an information presentation is chosen for the tablet, and the augmented reality mode is chosen for the smart watch, the preference would be given to a device with the highest richness of detail, which is the smart watch in this case. Furthermore different devices may have assigned different priorities, e.g. depending on the size of their display, such that if the augmented reality mode is suited on two devices, the device with the larger display is being used for information presentation.

Possible implementation steps according to an embodiment of the invention (Maintenance Use case):

1) User decides on the user task to perform (e.g. Maintenance).

2) The tracking system tries to determine a spatial relationship between a camera and a real object.

3) Once the tracking system succeeded, digital information is registered to the real object.

4) The AR mode is decided to be used to present for a digital information that is related to the selected user task and the real object.

5) Once the presentation mode is decided, the representation of the digital information is chosen for a given presentation mode (e.g. in the current implementation the 3-D model of the digital information is being loaded).

6) The tracking system stores the last N (=1, 2, 3, 4, . . . ) poses while tracking is successful.

7) Once tracking is lost (i.e. the real object is not visible in camera image), the system runs an embodiment of this invention to decide on a suitable presentation mode (i.e. in current implementation it switches to the VR mode with some descriptive instructions).

8) The digital information (3-D model) is positioned with the tracking pose N recorded in the Step 6.

9) Once tracking reinitializes, this implementation starts again from Step 3.

In another embodiment an application does not only store poses (i.e. spatial relationships between the camera and a reference coordinate system) but also camera (key) images while in the augmented reality presentation mode. These key images are stored so they can be displayed in the virtual reality presentation mode afterwards to represent at least part of the real object, i.e. as a representation of (at least part of) the real object. Different approaches could be used to determine which camera images to store. For example, a new camera image is only stored if there is no other image within the set of already stored (key) images which has a similar appearance. For example a new camera image is only added to the set of stored images if the similarity between the new image and all images in the set of stored images is below a particular threshold. The similarity between two images can for example be defined as the (normalized) cross-correlation between them. The similarity can further be computed based on the cross correlation of histograms over intensity or gradient directions of the two images. The similarity could further be computed based on the number of matches when detecting and describing local image features in both images with approaches such as SIFT and then considering all combinations of features from the two images as matches when their distance is below a particular threshold. The threshold to decide when to add a new image to the set may be manually provided once or it may adapt according to the similarities between the images in the set. In another embodiment, a new camera image is only stored, if there is no other image within the already stored images which has been taken under a similar camera pose. The similarity of two camera poses can be for example computed based on the difference in translation and the difference in orientation between the two poses.

Another embodiment further decides if a camera image should be stored for later use in the virtual reality presentation mode or not based on the camera pose and how the real object is visible in the camera image. For example an image is only stored as key image if at least a portion (e.g. 50%) of the real object is visible in the image. In another example, an image is only stored as key image if the real object occupies at least a minimum area in the image. This area could for example be 500 pixels or it could be a portion of the camera image, i.e. 25%. In another embodiment, it is further decided if a camera image should be stored for later use in the virtual reality presentation mode or not based on the camera pose and how digital information related to the real object would be superimposed on the camera image. For example, an embodiment would only store an image to be used in the virtual reality mode if at least part of the digital information would be visible if superimposed spatially registered with the camera image.

Possible implementation steps according to an embodiment (here: pedestrian navigation using GPS):

1) A user selects or inputs a desired destination to be navigated to.

2) A camera that is attached to a device's display is started and a first image is captured and presented to the user.

3) The tracking system initializes with listener for device's location updates.

4) Upon initialization a digital auxiliary information (POI object) is drawn on the screen that corresponds to the desired final destination.

5) Upon first location update (e.g. from GPS), the current location of the device is identified and the distance to the final destination is calculated and displayed on the POI.

6) A turn-by-turn route is calculated between the current location of the device and the requested final destination (potentially using a third party routing service, which involves communication to a server).

7) The route is divided into several atomic waypoints, that correspond to a single leg of the route.

8) The intermediate POIs are created for each waypoint, incorporating necessary digital instructions (e.g. in textual representation format) indicating how to proceed from each waypoint.

9) On every drawn frame, an algorithm checks the device's orientation with respect to gravity:
   a. When the optical axis of the camera is close to orthogonal to the gravity direction, Augmented Realty mode is suited, and instructions will be presented in (audio) visual format together with a live view to the user
   b. If augmented reality mode is not suited (e.g. because the device is stowed in a bag) audio information presentation mode will be chosen to proceed with navigation.

10) Upon following location updates the current distance to all waypoints will be calculated and instructions will be given to the user in an appropriate information presentation mode once the user within the vicinity of X meters to the nearest waypoint.

Figure 6:
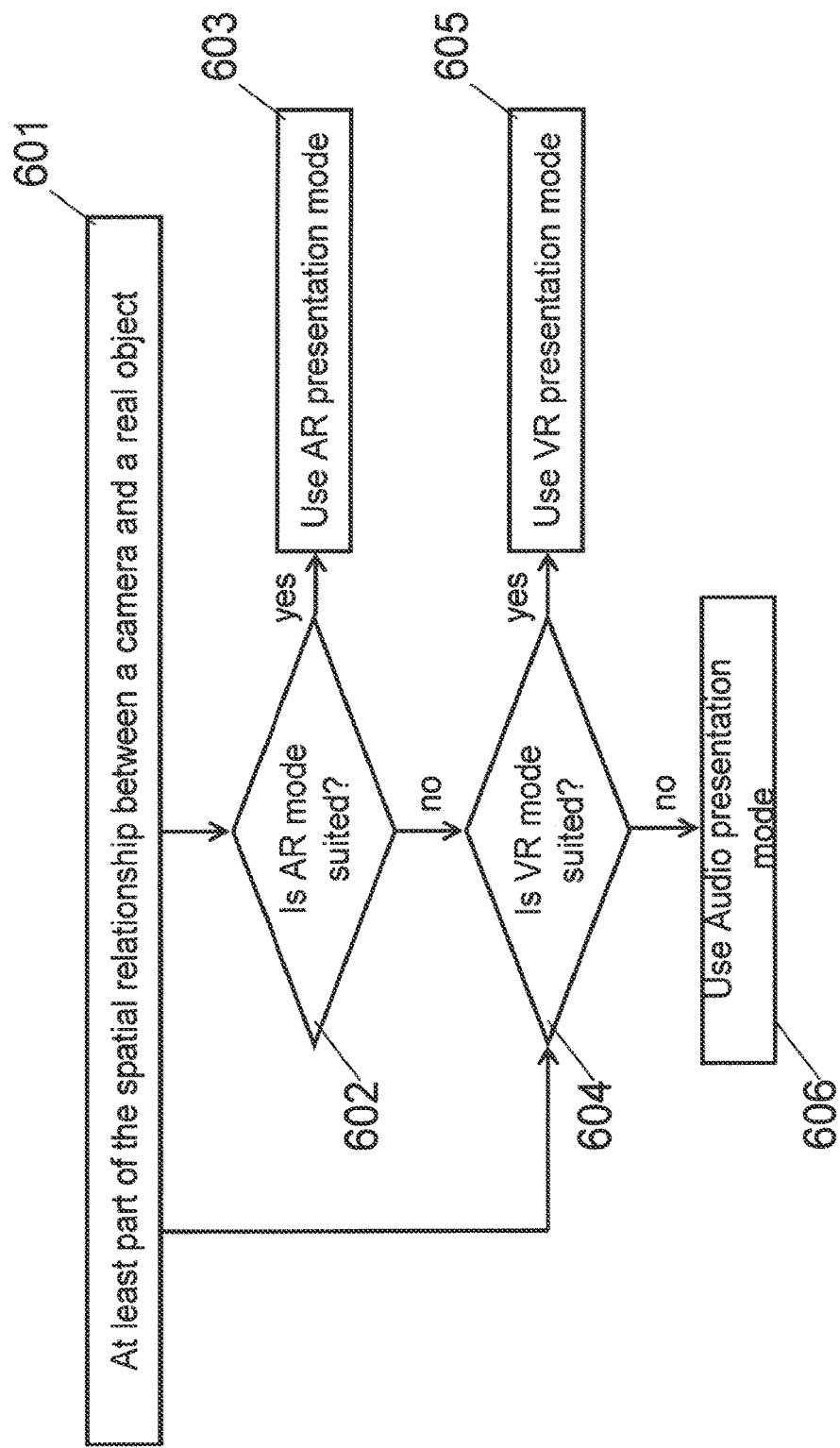
FIG. 6 depicts a workflow diagram according to an embodiment for a selection of an appropriate information presentation mode.

FIG. 6 depicts a workflow diagram according to an embodiment for a selection of an appropriate information presentation mode. The mode according to step 606 will be chosen as a fallback mode in the event when no other modes 603 or 605 that provide richer information presentation experience are suitable at the given context. Based on at least part of the spatial relationship between a camera and a real object (601), step 602 determines whether the augmented reality presentation mode is a suitable mode of information presentation. This can for example be implemented according to the embodiment shown in FIG. 7. If the AR mode is suitable, it is used (step 603). Otherwise step 604 determines if the virtual reality presentation mode is suitable given the spatial relationship 601. If so, the VR presentation mode is used (step 605). Otherwise, the Audio presentation mode is used (step 606). Note that both the AR presentation mode (603) and the VR presentation mode (605) might include auditory output.

Figure 7:
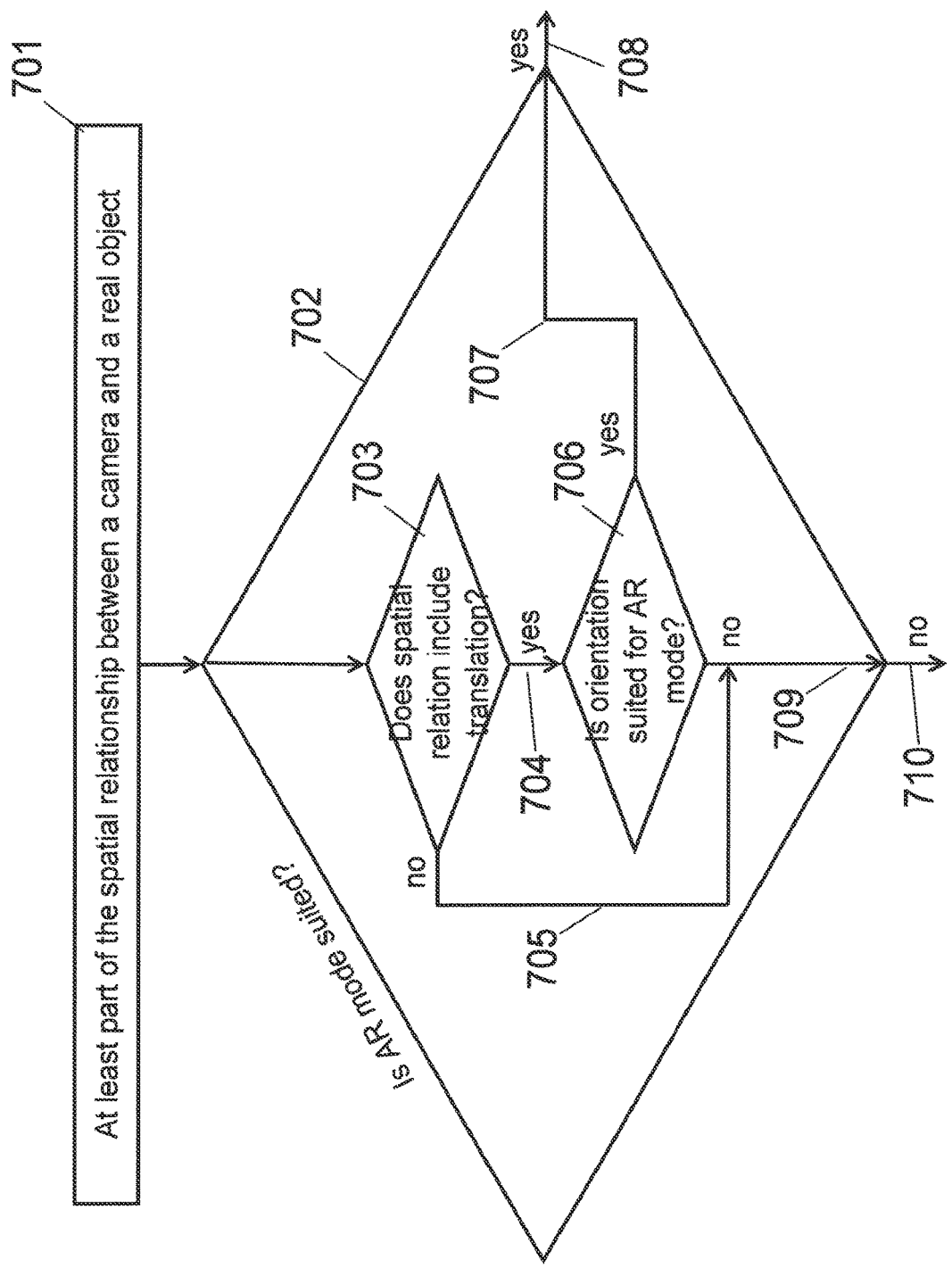
FIG. 7 shows a flow diagram of how an embodiment of the invention may determine if the augmented reality presentation mode is suited based on at least part of the spatial relationship between a camera and a real object.

FIG. 7 shows a flowchart of how an embodiment of the invention may determine if the augmented reality presentation mode is suited based on at least part of the spatial relationship between a camera and a real object 701. The decision block 702 corresponds to an embodiment of 602 in FIG. 6. Firstly, it is checked in step 703 if 701 includes at least part of a translation. If this is not the case (705), the decision block 702 comes to the conclusion that the AR presentation mode is not suited (710). Otherwise (704), it is further evaluated in step 706 if the orientation part of 701 is suited for the AR presentation mode. The orientation part of 701 enables transforming at least one vector indicative of a direction in the coordinate system of the object into the coordinate system of the camera. Then an embodiment of 706 would define a reference vector indicative of a direction expressed in the camera coordinate system and a threshold and 706 would require that the scalar product between the vector transformed from the object coordinate system to the camera coordinate system and the reference vector is above the threshold such that step 706 results in "yes". Multiple pairs of reference vectors and thresholds could be used.

For example if the real object is at least part of the environment, then the vector of interest could be the gravity vector. The spatial relationship between the camera and the real object in this case could be based on inertial sensors attached to the camera that measure the absolute orientation of the camera with respect to gravity. This allows for transforming the vector defined in the object coordinate system (i.e. the gravity vector) into the coordinate system of the camera.

Now, if, for example, the virtual reality presentation mode is only suited if the camera is looking on the floor (which is part of the environment and therefore part of the real object), then the following definitions of the reference vector and threshold could be used. The reference vector in the camera coordinate system could be a vector parallel to the principal axis of the camera. Let us assume both the vector indicative of the orientation of gravity in the camera coordinate system and the reference vector are of unit length. Defining the threshold as 0.9 and enforcing that the scalar product between the reference vector and the transformed vector is above this threshold then means the following. The angle between the principal camera axis and the normal of the floor (i.e. gravity vector) is less than cos.sup.−1(0.9) degrees, which is approximately 26 degrees.

In another example, if the augmented reality presentation mode is only suited if the camera is in portrait mode with respect to the real object (i.e. not in landscape mode). This could be implemented as follows. The reference vector in the camera coordinate system is defined as a vector parallel to the longer side of the imaging sensor of the camera and the vector transformed from object coordinates to camera coordinates is again the gravity vector as in the previous example. Now, if the threshold is chosen as 0.7071, this corresponds to an angle of 45 degrees between the two vectors, and the condition is only true if the camera is in a portrait orientation, not in a landscape orientation.

In another example, the real object is a garage with an open door (i.e. a cube with one face missing) and the digital information is a (virtual) car inside the garage. In this case, any camera orientation that does not allow for looking into the garage through the door could be considered not suited for the augmented reality presentation mode. The spatial relationship between a camera and the real object could in this example be determined based on visual camera tracking and comprise the full 6DoF camera pose. The vector in the object coordinate system is pointing inside the garage through the open door and it can be transformed to the camera coordinate system given the spatial relationship between the two. The reference vector in the camera coordinate system is defined parallel to the principal axis of the camera and the threshold could in this example be defined as 0.8. As a result, in this example, the augmented reality presentation mode is only suited if the camera orientation allows for looking into the garage through the open door, i.e. if the angle between the camera's principal axis and a vector pointing inside the door is less than .about.37 degrees, which corresponds to a scalar product of the transformed unit vector and the reference unit vector of more than 0.8. Instead of manually defining the threshold, it could also be defined depending on intrinsic camera parameters, such as the focal length, which may be provided once or estimated online.

If the orientation is not suited (709), the decision block 702 returns "no" (710). Otherwise the decision block 707 returns "yes" (708).

Figure 8:
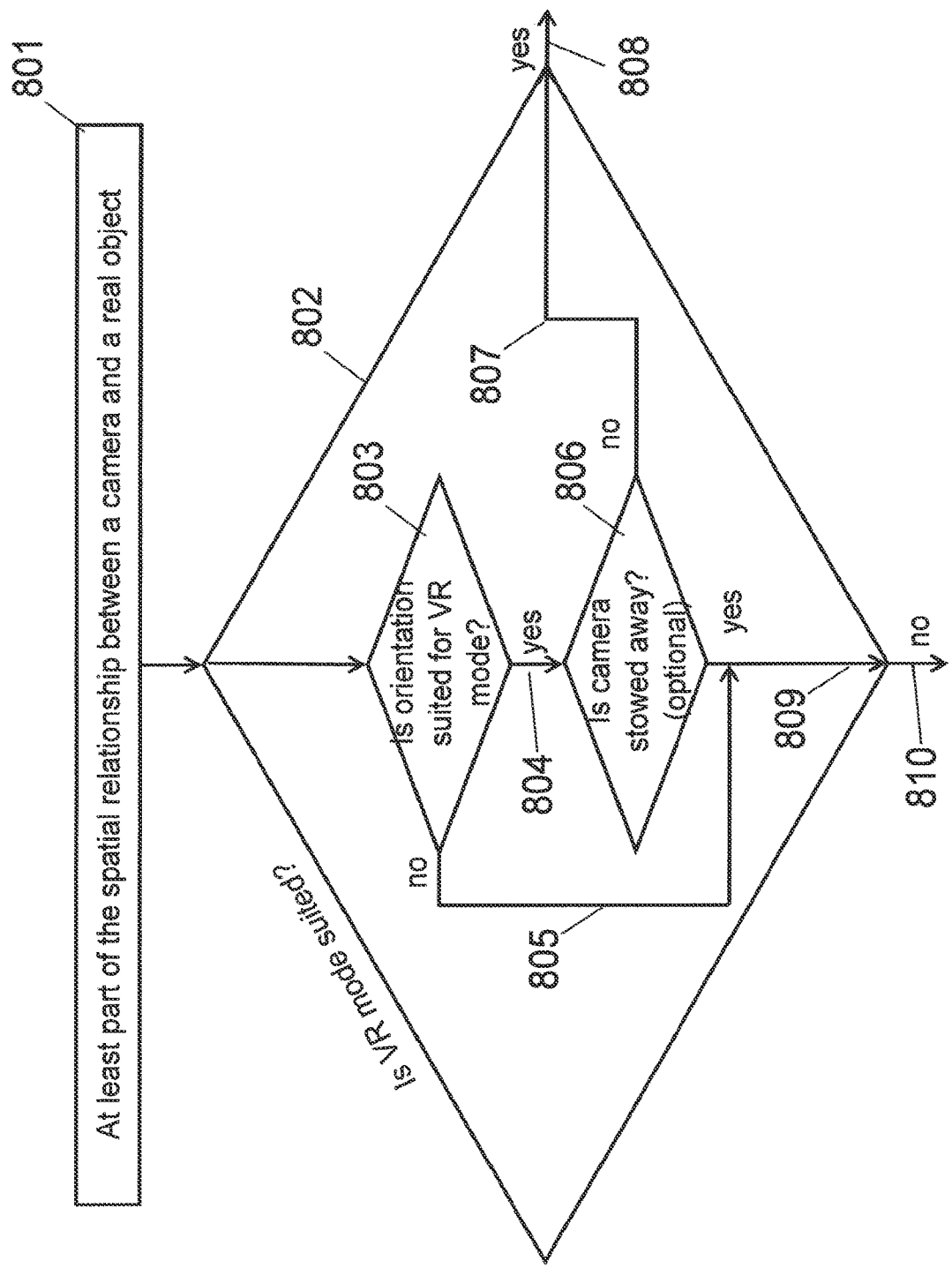
FIG. 8 shows a flow diagram of how an embodiment of the invention may determine if the virtual reality presentation mode is suited based on at least part of the spatial relationship between a camera and a real object.

FIG. 8 shows a flowchart of how an embodiment of the invention may determine if the virtual reality presentation mode is suited based on at least part of the spatial relationship between a camera and a real object 801. The decision block 802 corresponds to an embodiment of 604 in FIG. 6.

Firstly, it is checked in step 803 if the orientation part of 801 is suited for the VR presentation mode. The orientation part of 801 enables transforming at least one vector in the coordinate system of the object into the coordinate system of the camera. Then an embodiment of step 803 would define a reference vector expressed in the camera coordinate system and a threshold and step 803 would require that the scalar product between the vector transformed from the object coordinate system to the camera coordinate system and the reference vector is above the threshold such that step 803 results in "yes". Multiple pairs of reference vectors and threshold could be used. This formulation could for example result in 803 only returning "yes" when the camera is facing the lower hemisphere under the assumption that a display is facing opposite to the camera and that the display is only visible to a user if facing to the upper hemisphere. If the orientation is not suited (805) then the decision block 802 returns "no" (810). Otherwise (804) it is checked if the camera has been stowed away. An embodiment of block 806 is detailed in FIG. 9. If the camera has not been stowed away (807), the decision block 802 returns "yes", i.e. that the VR mode is suited. Otherwise (809) it returns "no", with 810 meaning that VR mode is not suited.

Figure 9:
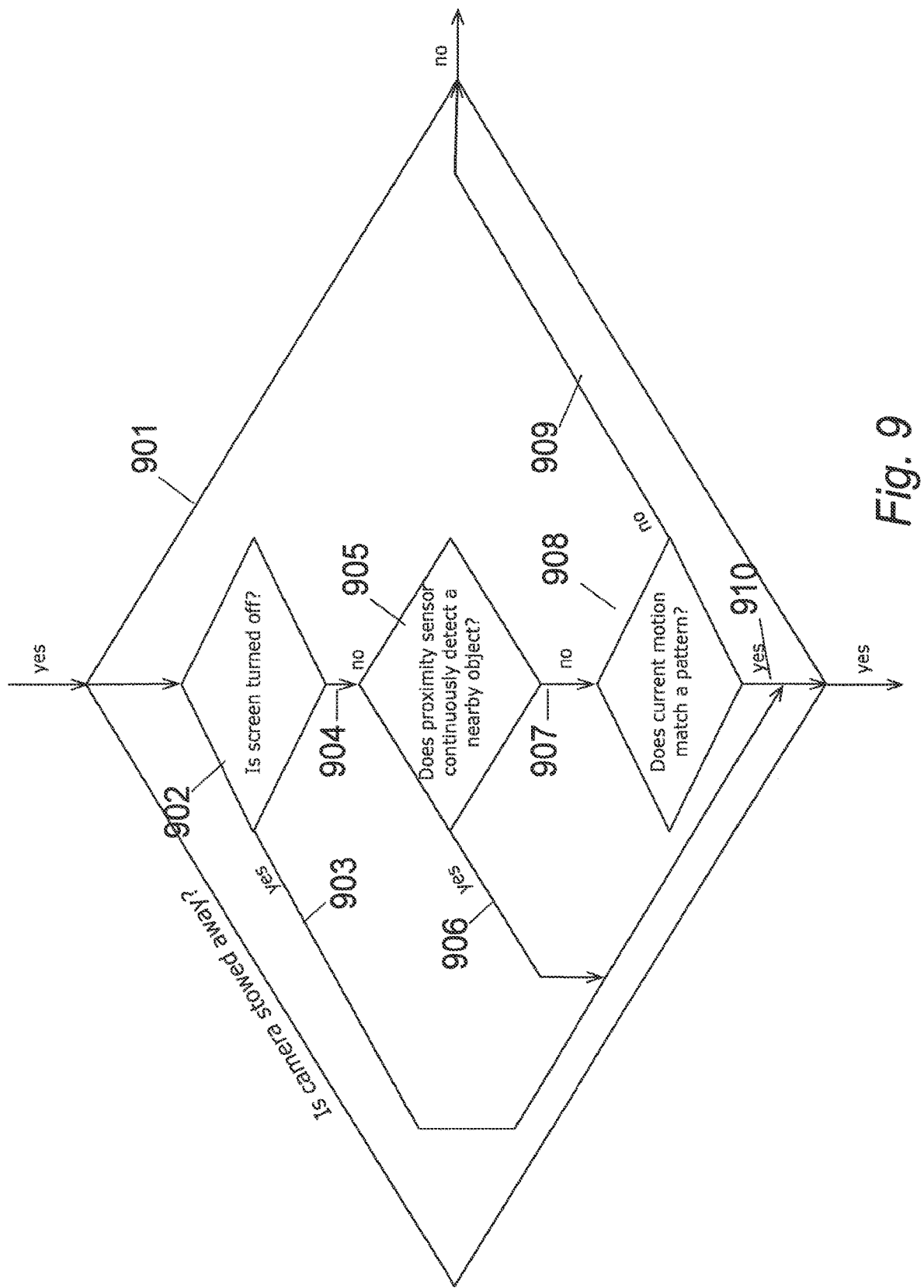
FIG. 9 shows a flow diagram of how an embodiment according to the invention may determine whether a camera is stowed away, FIGS. 10*a*-10*b* schematically show two scenarios in which a real object is observed through an optical see-through display by a human eye, wherein the field of view of the eye through the display includes and does not include, respectively, the real object.

FIG. 9 describes an embodiment 901 to determine whether a camera is stowed away. The decision block 902 checks whether the screen, (i.e. display) of the device comprising the camera is turned off. The display could be turned off manually by the user or switched off automatically by the operating system of a device after an idle period. In the event of 903 "yes" the decision block 901 returns "yes" (910) and we can conclude that the camera is stowed away. Thus, according to an embodiment (shown in FIG. 8) of the invention, step 809 will be executed meaning the VR mode is not suited. In the event that screen is turned on, we proceed with 904 "no" to decision block 905 to determine whether a proximity sensor continuously detects a nearby object for an extended period of time (e.g. 30 seconds). This can give us indication that the device might be placed inside an object (e.g. pocket or bag) and exclude arbitrary situations when a proximity sensor is covered unintentionally with a finger. In the event 906 "yes" we can conclude that the camera is stowed away. Thus, according to the embodiment shown in FIG. 8, step 809 will be executed and VR mode is not suited, otherwise we proceed with step 907 to exercise decision block 908 to determine whether the current motion matches any motion pattern. The motion thereby refers to at least part of the spatial relationship between a camera and a real object measured at least two points in time.

The motion of a camera relative to a real object refers to a movement of the camera between at least two positions relative to the real object. If the object is static (relative to the earth), the motion of the camera relative the real object is the same as a motion of the camera relative to the earth. If the object is dynamic (relative to the earth), the motion of the camera relative the real object is different from a motion of the camera relative to the earth.

There may exist (fused) sensor data from inertial sensors, (three-axis) accelerometers, (three-axis) gyroscopes, or other auxiliary sensors that provide information about device position or orientation. Using supervised machine learning techniques motion patterns corresponding to a device being carried in a pocket, a bag, or a purse may be learned. This enables identifying such situations later on and distinguishing them from arbitrary events that are not of interest (e.g. when the device is moved during walk, run, etc.) In the event 910 "yes" the decision block 901 returns "yes" and step 809 is executed. This means that the VR mode is not suited if the motion pattern is indicative of the camera being stowed away. Otherwise step 909 will result in the conclusion that camera is not stowed away, executing step 808, i.e. the VR mode.

The above embodiments can use different kinds of displays to present the digital information to a user, especially using the AR presentation mode or the VR presentation mode. In particular, they can use reflective and emissive displays such as LCD displays or LED displays. Such displays are for example used in handheld devices such as smartphones or tablet computers where they are rigidly connected to a back-facing camera. In the augmented reality presentation mode, these displays are used to show the live camera image and to present the digital information related to the real object overlaid with the live camera image. The embodiments described above can further use semi-transparent displays that allow the user to see through the display, and thereby optically see the environment through the display. This might include seeing the real object of interest in the augmented reality presentation mode where the display is only used to present the visual digital information but it does not present a live camera image. Such displays are for example based on OLED or LCD technology and are frequently found in head-mounted displays. In many cases, there is a camera rigidly attached to such head-mounted displays and in this case that camera can be the camera for which at least part of its spatial relationship relative to the object is determined. When head-mounted displays are worn, the spatial relationship between the user's eye and the display is usually approximately constant. However, it determines which part of the environment the user can see. If an optical see-through display, i.e. a semi-transparent display, is held in a user's hand, the spatial relationship between an eye and the real object becomes important to determine if an object can be (partially) seen through the display or not and this might then be indicative of whether the augmented reality presentation mode is suited or not. In this case, the decision on which mode of presentation to choose depends on a spatial relationship between an eye and at least one reference coordinate system. The at least one reference coordinate system might comprise a coordinate system of the real object and/or a coordinate system of the (semi-transparent) display.

A display (device) can create an image at different distances from an eye. A video projector (e.g. based on LCD, LED, DLP, CRT, or laser) is a display device that could be used in the context of this invention. It creates an image at the surface it projects onto, which might be at least part of the real object associated to which digital information is being displayed. For handheld devices, such as tablet computers or smartphones, the display (device) is located in the user's hands. Wearable computers often have displays attached to the user's body, e.g. at the wrist when using a smart watch, or in front of the eyes when using a head-mounted display. This invention may further use a display which is attached to a human eye, e.g. at the form factor of a contact lens, directly attached to the eyeball. The display device may further project light onto the retina of the user. In such cases the spatial relationship between the display and the eye may be static and we can assume the user can always see the display.

Note that the terms "display" and "display device" are used interchangeably throughout this document.

In the virtual reality presentation mode all kinds of displays discussed above may be used, which particularly includes optical see-through displays. In this case, instead of viewing the real object through the display, an image or a model of the real object may be shown on the display.

Figure 10B:
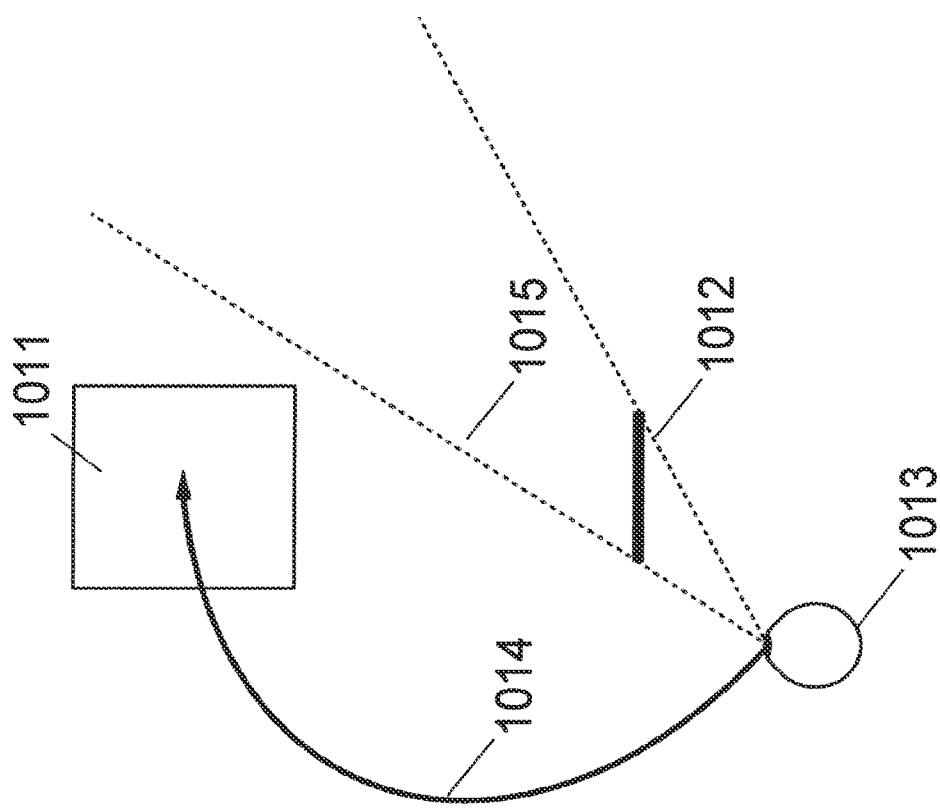
Figure 10A:
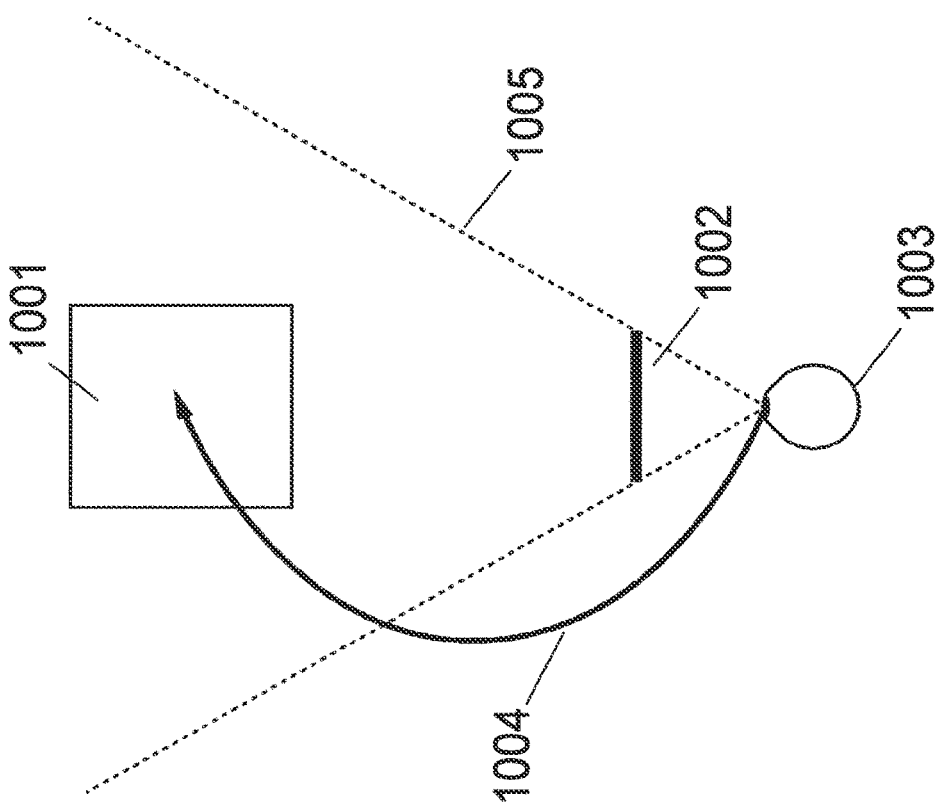

FIG. 10a shows schematically a real object 1001 that is observed through an optical see-through display 1002 by a human eye 1003. A spatial relationship 1004 between the eye and a coordinate system associated to the real object is determined and may serve as basis for the selection of a mode of presentation for digital information related to the real object 1001. In particular this spatial relationship 1004 influences the field of view 1005 of the eye 1003 through the display 1002. In the spatial relationship present in FIG. 10a, the real object 1001 is located within the field of view 1005 and therefore an embodiment of this invention may select the augmented reality presentation mode as mode to present digital information related to the real object 1001 on the display 1002. In one embodiment, a first camera attached to the display 1002 may capture an image of the real object 1001 in order to determine a first spatial relationship between the first camera and the real object. A second camera attached to the display 1002 may capture another image of the eye 1003 in order to determine a second spatial relationship between the second camera and the eye. A third spatial relationship between the first and second cameras may be known. Then, the spatial relationship 1004 could be determined according to the first, second and third spatial relationships.

In FIG. 10b there is shown a real object 1011, an optical see-through display 1012 and an eye 1013. Again a spatial relationship 1014 between the eye and a coordinate system is determined, where in this case the coordinate system is associated to the real object 1011. This spatial relationship in this case is indicative of that the field of view 1015 of the eye 1013 through the display 1012 does not include any part of the real object 1011. In this case, an embodiment of the present invention would select the virtual reality mode according to the spatial relationship 1014.

All embodiments mentioned above for determining which mode of information presentation to choose from a plurality of modes based on an input of a spatial relationship between a camera and a coordinate system (e.g. associated to a real object) may analogously be performed based on a spatial relationship between an eye and a coordinate system (e.g. associated to a real object or to a display). In this case, the camera is equivalent to the eye.

There are several approaches possible how to determine a spatial relationship between an eye and a coordinate system. In one embodiment, the spatial relationship between an eye and a coordinate system is determined based on an image captured by a camera and by detecting the position of an eye in the camera image. This can for example be done based on features such as corneal reflection and the center of the pupil. The camera image may capture visible light or infrared light, or a combination of both might be used. Such methods result in a spatial relationship between an eye and a coordinate system of a camera. If a spatial relationship between the coordinate system of the camera and a second coordinate system is known, then the spatial relationship between the eye and the second coordinate system can be determined by concatenation.

Another embodiment uses a face detection or face tracking method to determine a spatial relationship between a camera and a face. Any state-of-the-art algorithm could be used that operates on an image either in grayscale format or RGB, YUV or any other color format. Furthermore, algorithms operating on range data, e.g. obtained from passive or active stereo cameras or time of flight cameras may be used. The detection may for example be based on neuronal networks, support vector machines, or any other approach using machine learning. If the spatial relationship between a coordinate system of the camera and a face has been determined according to an algorithm as described above, the spatial relationship between the coordinate system of the camera and an eye in the face can be determined given the known spatial relationship between a face and an eye in the face. Analogously to the previous example, if the a spatial relationship between the coordinate system of the camera and a second coordinate system is known, then the spatial relationship between the eye and the second coordinate system can be determined by concatenation.

This invention further comprises a method to inform the user that the digital information is not available in a representation suitable for the mode of presentation selected according to the current spatial relationship between a camera (or an eye) and the real object. In this case the system may further give an instruction about movements or positions or orientations such that the spatial relationship between the camera (or eye) and the real object could be changed accordingly in order to select another mode of presentation.

Further, different modes of presentation could have different weights indicative of their presentation precedence, which may be given manually. For example, the AR presentation mode may be given a higher weight than the VR and audio presentation modes. The VR presentation mode may be given a higher weight than the audio presentation mode. When two presentation modes (e.g. the AR presentation and VR presentation modes) are determined to be selected according to the spatial relationship, then the one (e.g. the AR presentation mode) that has a higher weight may be finally chosen for presenting the digital information.

Different representations of the digital information may have different levels of richness, which could also be manually defined.

There is further disclosed herein a method to inform the user that a different mode of presentation could provide the user with a richer representation of the digital information, and give an instruction about movements or positions or orientations to the user to change the spatial relationship between the camera (or eye) and the real object such that the mode of information presentation is suited for presenting the digital information in a richer way. For example, if the mode of presentation is the audio mode and the digital information describes a particular position at a facade, then the audio mode could for example explain that the position is located between the 4.sup.th floor and the 5.sup.th floor and that it is located on the left side of a billboard at the facade, while the augmented reality mode could present the same information in a much richer and plain way by simply displaying a point or cross at the respective position. In this case, the method would suggest to the user that a different mode of information presentation would provide richer information in the current situation and give instructions (like a voice command of "move the camera towards the billboard or place the camera horizontally") to the user in order to encourage the user to move the camera such that the AR mode is suited.

Informing the user that a different mode of presentation could provide the user with a richer presentation of the digital information may also be beneficial depending on spatial relationships. For example if the real object is a car and the digital information is how to refill cooling liquid (e.g. the digital information may be a procedure to refill cooling liquid), then the user with a tablet computer could first point the camera towards the engine room of the car and the augmented reality presentation mode would be used to present where to refill the fluid superimposed on a live camera image. After putting the template computer on the side, an embodiment of this invention would switch to the virtual reality presentation mode and show an image of the engine room, which has been captured during the augmented reality presentation mode, superimposed with the digital information, e.g. as a virtual 3D model. After the user confirms that he or she followed the digital information and refilled the cooling fluid, the next maintenance step, i.e. the next digital information, could be to refuel the car. The virtual reality mode would present a virtual 3D model of the real car superimposed with virtual 3D instructions, but it cannot present a camera image of the real car because the relevant part of the car, i.e. the fuel filler flap, has not been captured yet in the augmented reality mode and therefore no camera image of the flap exists.

A method according to an embodiment of this invention would now inform the user that moving the tablet computer to a pose where the camera captures at least part of the fuel filler flap would enable presenting a richer representation of the real object and therefore of the digital information. Moving the tablet computer accordingly would make the augmented reality view suitable and afterwards, after at least one camera image (i.e. photo) of the flap has been stored, also the virtual reality mode would enable a richer representation by showing a photo of the car instead of rendering a 3D model of it which has less details and looks less realistic.

The level of richness can be manually defined as the augmented reality mode being the presentation mode with the richest information, the virtual reality mode being the presentation mode with the second richest information, and the audio mode as being the presentation mode with the least rich information. The richness may further depend on the individual use case and therefore the order of richness may be defined for each use case and each digital information independently. If the digital information is a song, for example, then the Audio mode would provide a richer presentation by playing a record of the song than for example the virtual reality mode which would for example show the notes or the lyrics of the song.

Information Presentation:

A mode of information presentation is a method to present digital information related to a real object. Modes of information presentation may include, but are not limited to:

1) Augmented reality (AR) presentation: digital information is superimposed on a live view of the real object. The live view may be implemented as a live camera image of the real object (video see-through) or it may be based on a view of the real object through an optical see-through display. This form of presentation is based on a display.

2) Virtual reality (VR) presentation: digital information is shown together with a digital visual representation of the real object, e.g. in the form of a 3D geometrical model of the real object, a digital video, a digital photo or image. This form of presentation is based on a display.

In both the AR and the VR presentation mode, a display device (e.g. a LCD screen or a semi-transparent screen) is used to display the digital information.

3) Audio Presentation: digital information is presented auditorily, for example using headphones or loudspeakers. This mode of information presentation does not require any display.

A suitable mode of information presentation is chosen, for example, as described in the embodiment according to FIG. 6.

Representation:

Data representation is an abstraction indicating how digital information related to a real object is stored in the computer. A suited format of data representation is chosen based on the information presentation mode. It includes at least one data representation format for each information presentation mode. Any combination of data representation formats may be used to enrich a given information presentation mode and may include, but is not limited to:

1) For augmented reality (AR) presentation, the data representation of the digital information related to the real object and presented on the display may for example be a digital (animated) 3D model, a digital (animated) 2D model, a video, an image, a textual information, or an audio file.

2) For virtual reality (VR) presentation, the data representation of the digital information related to the real object and presented on the display may for example be a digital (animated) 3D model, a digital (animated) 2D model, a video, an image, a textual information, or an audio file.

3) For audio presentation, the data representation of the digital information related to the real object may be a digital sound file, or text, which can be converted to speech by means of software (e.g. text-to-speech).

Although various embodiments are described herein with reference to certain components, any other configuration of components, as described herein or evident to the skilled person, can also be used when implementing any of these embodiments. Any of the devices or components as described herein may be or may comprise a respective processing device (not explicitly shown), such as a microprocessor, for performing some or more of the tasks as described herein. One or more of the processing tasks may be processed by one or more of the components or their processing devices which are communicating with each other, e.g. by a respective point to point communication or via a network, e.g. via a server computer.

The invention claimed is:

1. A method of presenting a digital information related to a real object, comprising:
   determining a field of view of an eye of a user of an electronic device through a display of the electronic device for which digital information is to be presented;
   in response to a determination that at least part of a real object is visible within the field of view, selecting an augmented reality ("AR") presentation mode from among a plurality of information presentation modes which support the presentation of the digital information;
   presenting the digital information using the AR presentation mode; and
   during the AR presentation mode and in accordance with a change in spatial relationship between the eye of the user and the real object with respect to the display:
   determining that at least part of the real object is outside the field of view;
   selecting a second information presentation mode from among the plurality of information presentation modes based on the determination that at least part of the real object is outside the field of view, and
   switching the presentation of the digital information from the AR presentation mode to the second information presentation mode based on the change in the spatial relationship.

2. The method of claim 1, wherein the second information presentation mode comprises at least one of a virtual reality mode and an audio mode.

3. The method according to claim 2, wherein selecting the presentation mode comprises:
  determining if a gaze of one or more eyes locates on a display device, and
  in response to determining that the gaze of one or more eyes does not locate on the display device, selecting an audio mode as the presentation mode.

4. The method of claim 1, further comprising capturing a live view of the real object by a camera of the electronic device,
  wherein an image of the real object is captured by the camera, and
  wherein the live view of the real object is based on a view of the image presented on a display of the electronic device.

5. The method of claim 1, further comprising capturing a view of the real object through a semi-transparent display.

6. The method of claim 1, wherein the spatial relationship is determined based on a spatial relationship between the eye and a coordinate system associated with the real object.

7. A non-transitory computer readable medium comprising computer readable code for presenting a digital information related to a real object, the computer readable code executable by one or more processors to:
  determine a field of view of an eye of a user of an electronic device through a display of the electronic device for which digital information is to be presented;
  in response to a determination that at least part of a real object is visible within the field of view, select an augmented reality ("AR") presentation mode from among a plurality of information presentation modes which support the presentation of the digital information;
  present the digital information using the AR presentation mode; and
  during the AR presentation mode and in accordance with a change in spatial relationship between the eye of the user and the real object with respect to the display:
    determine that at least part of the real object is outside the field of view;
    select a second information presentation mode from among the plurality of information presentation modes based on the determination that at least part of the real object is outside the field of view, and
    switch the presentation of the digital information from the AR presentation mode to the second information presentation mode based on the change in the spatial relationship.

8. The non-transitory computer readable medium of claim 7, wherein the second information presentation mode comprises at least one of a virtual reality mode and an audio mode.

9. The non-transitory computer readable medium of claim 8, wherein the computer readable code executable by one or more processors to select the presentation mode comprises computer readable code executable by one or more processors to:
  determine if a gaze of one or more eyes locates on a display device, and
  in response to determining that the gaze of one or more eyes does not locate on the display device, select an audio mode as the presentation mode.

10. The non-transitory computer readable medium of claim 7, further comprising computer readable code executable by one or more processors to capture a live view of the real object by a camera of the electronic device,
  wherein an image of the real object is captured by the camera, and
  wherein the live view of the real object is based on a view of the image presented on a display of the electronic device.

11. The non-transitory computer readable medium of claim 7, further comprising computer readable code to capture a view of the real object through a semi-transparent display.

12. The non-transitory computer readable medium of claim 7, wherein the spatial relationship is determined based on a spatial relationship between the eye and a coordinate system associated with the real object.

13. A system for presenting a digital information related to a real object, comprising:
  one or more processors; and
  one or more computer readable media comprising computer readable code executable by one or more processors to:
    determine a field of view of an eye of a user of an electronic device through a display of the electronic device for which digital information is to be presented;
    in response to a determination that at least part of a real object is visible within the field of view, select an augmented reality ("AR") presentation mode from among a plurality of information presentation modes which support the presentation of the digital information;
    present the digital information using the AR presentation mode; and
    during the AR presentation mode and in accordance with a change in spatial relationship between the eye of the user and the real object with respect to the display:
      determine that at least part of the real object is outside the field of view;
      select a second information presentation mode from among the plurality of information presentation modes based on the determination that at least part of the real object is outside the field of view, and
      switch the presentation of the digital information from the AR presentation mode to the second information presentation mode based on the change in the spatial relationship.

14. The system of claim 13, wherein the second information presentation mode comprises at least one of a virtual reality mode and an audio mode.

15. The system of claim 14, wherein the computer readable code executable by one or more processors to select the presentation mode comprises computer readable code executable by one or more processors to:
  determine if a gaze of one or more eyes locates on a display device, and
  in response to determining that the gaze of one or more eyes does not locate on the display device, select an audio mode as the presentation mode.

16. The system of claim 13, further comprising computer readable code executable by one or more processors to capture a live view of the real object by a camera of the electronic device,
  wherein an image of the real object is captured by the camera, and
  wherein the live view of the real object is based on a view of the image presented on a display of the electronic device.

17. The system of claim 13, further comprising computer readable code to capture a view of the real object through a semi-transparent display.

18. The system of claim 13, wherein the spatial relationship is determined based on a spatial relationship between the eye and a coordinate system associated with the real object.

\* \* \* \* \*

UNITED STATES PATENT AND TRADEMARK OFFICE
CERTIFICATE OF CORRECTION

| | |
|---|---|
| PATENT NO. | : 12,039,644 B2 |
| APPLICATION NO. | : 17/323542 |
| DATED | : July 16, 2024 |
| INVENTOR(S) | : Daniel Kurz et al. |

It is certified that error appears in the above-identified patent and that said Letters Patent is hereby corrected as shown below:

In the Claims

Column 25, Line 26: replace the word "determine" with the word --determining--

Column 26, Line 20: replace the word "determine" with the word --determining--

Signed and Sealed this
Thirteenth Day of August, 2024

Katherine Kelly Vidal
*Director of the United States Patent and Trademark Office*